United States Patent [19]

Kiko et al.

[11] Patent Number: 4,852,160
[45] Date of Patent: Jul. 25, 1989

[54] CHANNEL UNIT INTERFACE CIRCUIT

[76] Inventors: Frederick J. Kiko, 262 Lakeshore La., Bloomingdale, Ill. 60108; George Kummer, 413 S. Albert, Mt. Prospect, Ill. 60056

[21] Appl. No.: 21,385

[22] Filed: Mar. 3, 1987

[51] Int. Cl.[4] .............................................. H04B 3/03
[52] U.S. Cl. .................................... 379/405; 379/399; 379/339; 379/398
[58] Field of Search .................. 379/93, 94, 252, 253, 379/338, 339, 340, 341, 344, 345, 348, 324, 398, 399, 400, 401, 402, 403, 404, 405, 406, 412, 413; 370/53, 57, 58, 63, 64, 71, 69.1, 124, 75, 77, 100, 105, 110.1, 112, 114

[56] References Cited

U.S. PATENT DOCUMENTS

| | | | |
|---|---|---|---|
| 4,287,393 | 9/1981 | Reuvekamp | 379/413 X |
| 4,398,143 | 8/1983 | Bonis | 379/413 X |
| 4,476,350 | 10/1984 | Aull et al. | 379/413 X |
| 4,636,584 | 1/1987 | Binherd et al. | 370/110.1 X |
| 4,677,669 | 6/1987 | Kawami et al. | 379/413 |

Primary Examiner—Jin F. Ng
Assistant Examiner—Randall S. Vaas
Attorney, Agent, or Firm—Robert J. Schneider; Davis Chin

[57] ABSTRACT

A channel unit interface circuit for interconnecting a two-wire, bidirectional signal transmitting means and a four-wire signal transmitting means in a communication system includes a tip terminal line driver, a ring terminal line driver, a voice sense amplifier, a balance network, A/D signal processing circuit, D/A signal processing circuit, filter network, a voice codec/PCM filter, a channel logic circuit, and a DC-to-DC converter. The channel unit interface circuit is suitable for use with substantially all of the different alarm-signalling techniques utilized by the various alarm companies for connecting their equipment to a channel bank coupled to the four-wire means. The interface circuit simulates a transmission line or cable over carrier in the frequency range of DC to 3.5 KHz with an amplitude variation between +110 to −200 VDC.

15 Claims, 9 Drawing Sheets

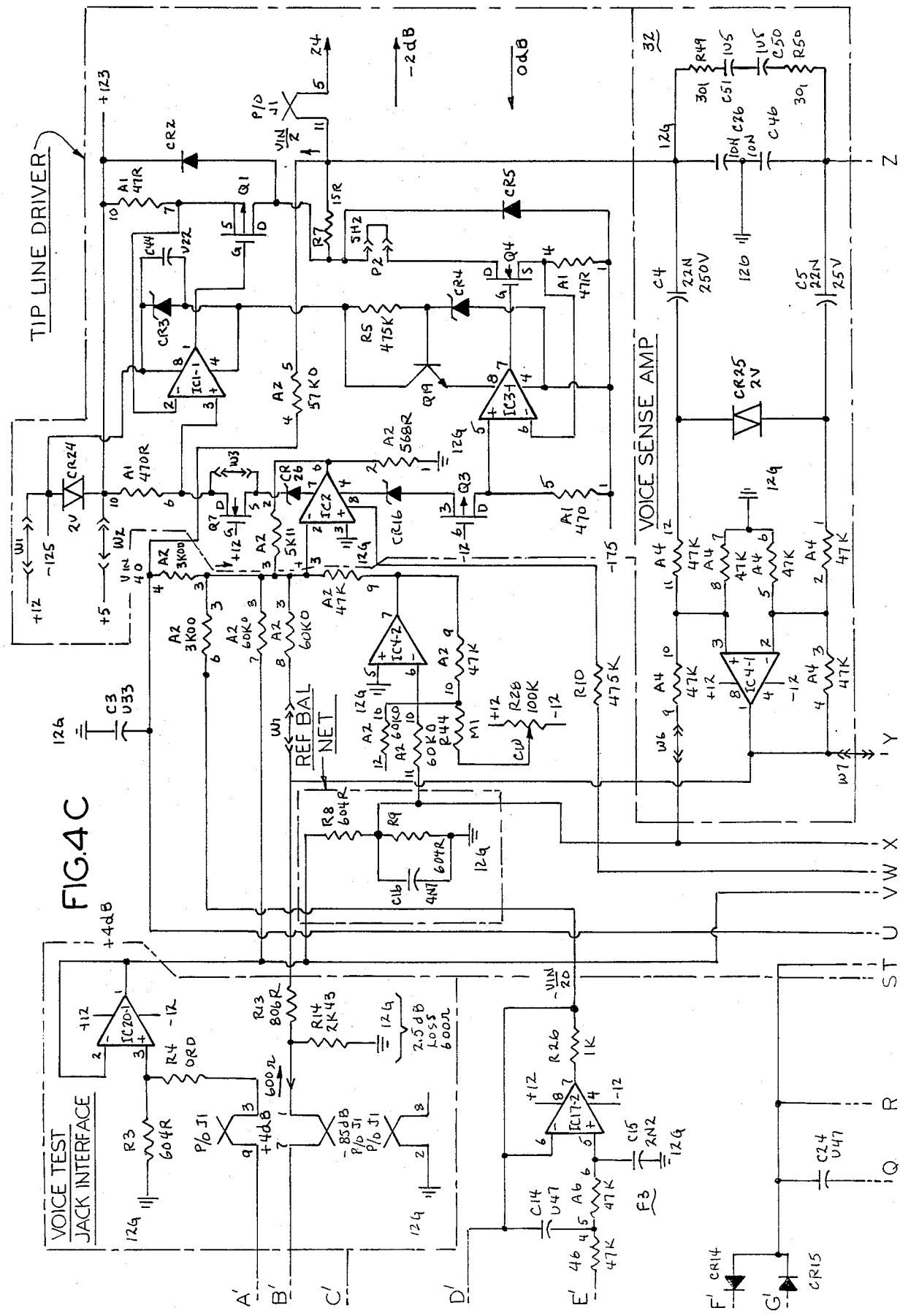

CHANNEL UNIT INTERFACE CIRCUIT

BACKGROUND OF THE INVENTION

This invention relates generally to communication systems and more particularly, it relates to a channel unit interface circuit for interconnecting a two-wire transmission path to a four-wire transmission path. The channel unit interface circuit has particular use in direct current (DC), low frequency, and voice frequency applications for interfacing between a multiplexer having a four-wire circuit and a customer station having a two-wire circuit.

Typically, burglar and fire alarm companies are two-wire transmission lines leased or rented from telephone companies for connecting alarm-monitoring equipment located in their monitoring office to alarm-detection equipment at a customer's premise. These two-wires lines are generally a part of the same wire pairs in a large multiconductor cable furnished by telephone companies over the past many years. However, in recent years, the telephone companies have generally not been burying or hanging additional cables to be used by the alarm companies but have been converting the existing cables to a digital carrier system in order to obtain an increased number of voice and data transmissions over a single cable.

As a result, a new problem has been created since most of the alarm signals generated by the burglar and fire alarm companies are simply not compatible with existing digital carrier channel units which are the normal interface with the digital carrier system. At present, there are at least fifty different alarm techniques which are utilized in signalling alarm conditions over the two-wire cables and only a small number of them can be directly coupled into the digital carrier system with the existing channel units. While some alarm companies have adapted their particular alarm signals so as to operate with such existing channel units, this suffers from the disadvantage of requiring the alarm or telephone companies to design special equipment for use with each of the different alarm techniques, which becomes quite complicated and uneconomical.

Hence, there has arisen a need for a channel unit interface circuit which is compatible with substantially all of the different alarm techniques. In the present invention, there is provided a channel unit interface circuit which simulates a cable pair or transmission lines over a digital carrier system in the frequency range of DC to 3.5 KHz with an amplitude between +110 to −200 VDC, or any amplitude range.

SUMMARY OF THE INVENTION

Accordingly, it is a general object of the present invention to provide a channel unit interface circuit for interconnecting a two-wire transmission path to a four-wire digital transmission path which is compatible with substantially all of the different alarm techniques utilized in signalling alarm conditions.

It is an object of the present invention to provide a channel unit interface circuit which simulates a cable pair in the frequency range of DC to 3.5 KHz with an amplitude between +110 to −200 VDC.

It is another object of the present invention to provide a channel unit interface circuit which includes means for generating simulated series impedances from tip terminal of a two-wire transmission path at one location to tip terminal of the two-wire transmission path at another location and from ring terminal of the two-wire transmission path at one location to ring terminal of the two-wire transmission path at another location in response to incoming, tip and ring terminals, direct current (DC) signals from a two-wire transmission path.

It is still another object of the present invention to provide a channel unit interface circuit which includes tip and ring line driver means responsive to a voltage on tip and ring terminals for generating an alternating current (AC) input impedance across tip and ring terminals of a two-wire transmission path.

It is yet still another object of the present invention to provide a channel unit interface circuit which includes power supply booster control means responsive to the various levels of incoming signals applied to tip and ring terminals for increasing correspondingly supply voltages applied to tip and ring line driver means so as to provide sufficient margin for voltage swings appearing in the tip and ring line driver means, thereby conserving power consumption and heat dissipation.

In accordance with these aims and objectives, the present invention is concerned with the provision of a channel unit interface circuit for interconnecting a two-wire, bidirectional signal transmitting means and a four-wire signal transmitting and receiving means in a digital carrier system. The channel unit interface circuit includes a two-wire port having tip and ring terminals which are adapted for connection to the two-wire, bidirectional signal transmitting means. There is provided a signal receive port which is adapted for connection to a first signal transmission path of the four-wire means for receiving incoming encoded DC to 60 Hz (DC band) frequency signals and 200 Hz to 3.5 KHz (voice band) frequency signals. A signal transmit port is adapted for connection to a second signal transmission path of four-wire means for supplying outgoing encoded "DC band" frequency signals and "voice band" frequency signals thereto. Circuit means formed of voice codec (an acronym for coder/decoder) means, analog-to-digital (A/D) signal processing means and digital-to-analog (D/A) signal processing means are coupled to the four-wire means for supplying the incoming "voice band" frequency signals at a first node connected to the codec means and supplying the incoming tip and ring DC band frequency signals at second and third nodes connected to the D/A signal processing means.

A tip terminal current line driver means is connected between the first node and the tip terminal and is responsive to the incoming voice band frequency signals arriving at the first node from the codec means for applying to the tip terminal outgoing tip voice band frequency signals. A ring terminal current line drive means is connected between the first node and the ring terminal and is responsive to the incoming "voice band" frequency signals arriving at the first node from the codec means for applying to the ring terminal outgoing ring "voice band" frequency signals. A voice sense amplifier means is coupled between the tip and the ring terminal line driver means and across the two-wire port. The voice sense amplifier means is responsive to incoming differential voice signals from the two-wire means for generating an output voltage. The tip and ring terminal line driver means are responsive to the output voltage for generating an AC input impedance across the tip and ring terminals.

The circuit means has a fourth node connected to the encoder of the coder means and to an output of the voice sense amplifier means for supplying the outgoing "voice band" frequency signals for transmission over the second path of the digital four-wire means. The tip terminal current line driver means is also responsive to the incoming tip "DC band" frequency signals arriving at the second node from the D/A signal processing means for applying to the tip terminal outgoing tip terminal "DC band" frequency signals. The ring terminal current line driver means is also responsive to the incoming ring terminal "DC band" frequency signals arriving at the third node from the D/A signal processing means for applying to the ring terminal outgoing ring terminal "DC band" frequency signals.

A first feedback impedance is coupled between the tip terminal and an input of the tip current line driver means and is responsive to incoming tip "DC band" frequency signals from the two-wire means for generating a simulated series tip terminal line impedance. A second feedback impedance is coupled between the ring terminal and an input of the ring terminal current line driver means and is responsive to incoming ring terminal "DC band" frequency signals from the two-wire means for generating a simulated series ring terminal line impedance. The circuit means has a fifth node connected to the A/D signal processing means and to the first impedance for supplying the incoming tip "DC band" frequency signals for transmission over the second path of the four-wire digital means. The circuit means has a sixth node connected to the A/D signal processing means and to the second impedance for supplying the incoming ring terminal "DC band" frequency signals for transmission over the second path of the four-wire digital means. A balance network is operatively connected to the voice sense amplifier means for preventing the incoming "voice band" frequency signals in the first path from the four-wire digital means from being returned to the second path of the four-wire digital means.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 3 is a simplified representation of the simulated DC resistance of a cable pair connected between the channel unit interface circuits of the present invention;

FIGS. 4(a) through 4(d), when connected together, is a detailed schematic circuit diagram of the channel unit interface circuit constructed in accordance with the present invention;

DESCRIPTION OF THE PREFERRED EMBODIMENT

Figure 1:
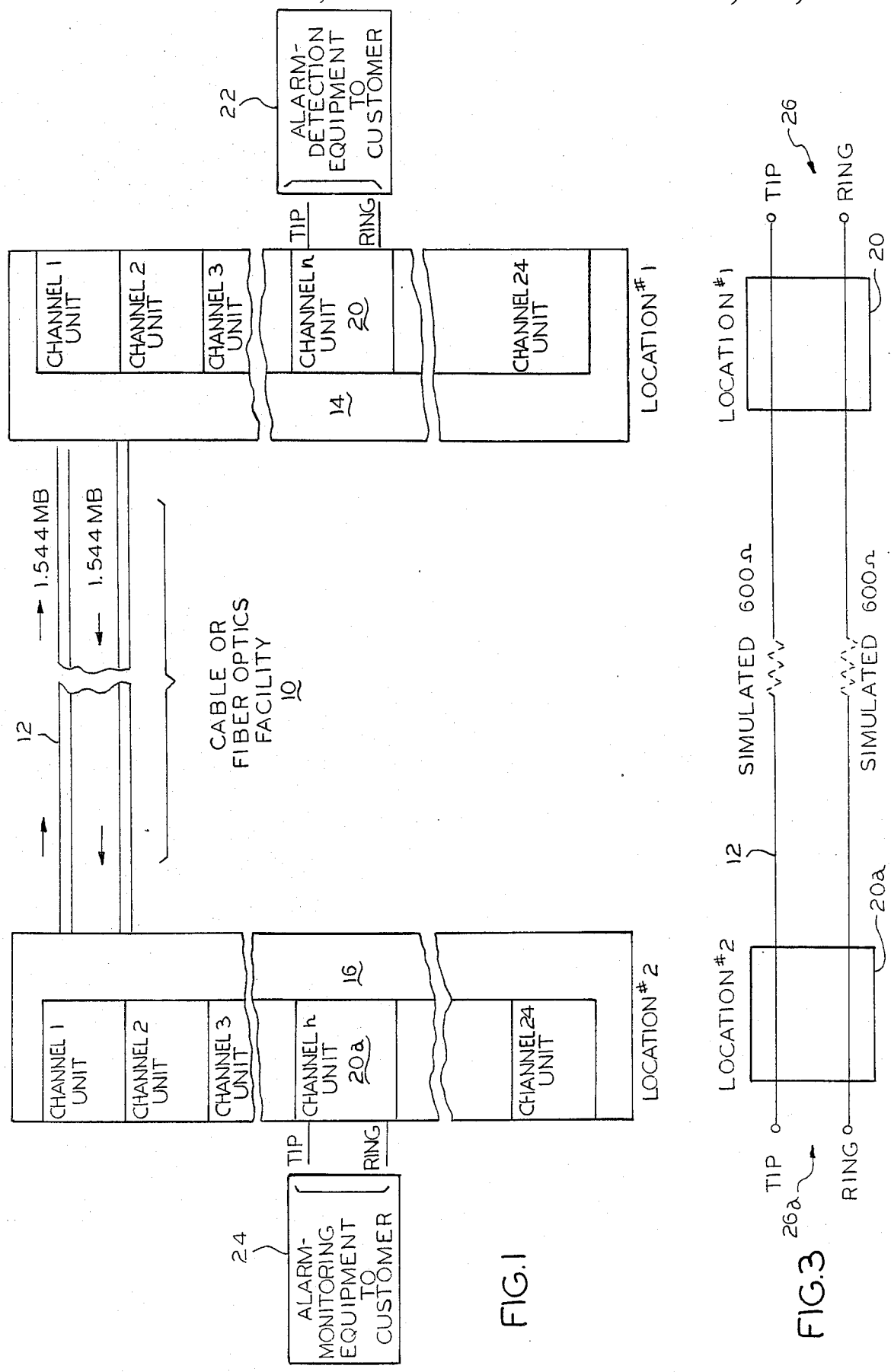
FIG. 1 is a general block diagram of a communication system which incorporates a pair of channel unit interface circuits constructed in accordance with the principles of the present invention.

Referring now in detail to the drawings, there is shown in FIG. 1 a general block diagram of a communication system 10 which incorporates channel unit interface circuits constructed in accordance with the principles of the present invention. The communication system 10 includes transmission lines 12 which are interconnected between a first channel bank multiplexer 14 disposed at a first central office or location #1 and a second channel bank multiplexer 16 disposed at a second central office or location #2. The transmission lines 12 are typically in the form of a cable or fiber optics transmission medium suitable for a digital carrier system. Each of the channel bank multiplexers 14 and 16 may typically accommodate up to twenty-four channel unit interface circuits. The channel unit interface circuit 20 refers to an interface circuit of the present invention in the channel bank 14 and is connected between the channel bank 14 and the alarm-detection equipment 22 in a customer's premise to be monitored by an alarm company. The channel unit interface circuit 20a refers to an interface circuit of the present invention in the channel bank 16 and is connected between the channel bank 16 and alarm-monitoring equipment 24 in a monitoring facility of the alarm company. Since the interface circuits 20 and 20a are identical in construction, it will only be necessary to describe the components and operation of one of them.

Heretofore, it was not possible to connect many of the various types of alarm-detection equipment 22 and the alarm-monitoring equipment 24 of the various alarm companies directly to the channel banks via existing channel units. This is because many of the different alarm-signalling techniques used by the various alarm companies. Thus, there was required the need of specially designed channel units for each of the different alarm-signalling techniques which proved to be time-consuming and expensive. Therefore, there has arisen the need of a universal-type channel unit interface circuit which could be used by substantially all of the various alarm companies for connecting their equipment to the channel banks. This has been accomplished in the present invention by providing a channel unit interface circuit which simulates a transmission line or cable in almost every respect in the frequency range of DC to 60 Hz and 200 Hz to 3.5 KHz with an amplitude range between +110 to −200 VDC.

Figure 2:
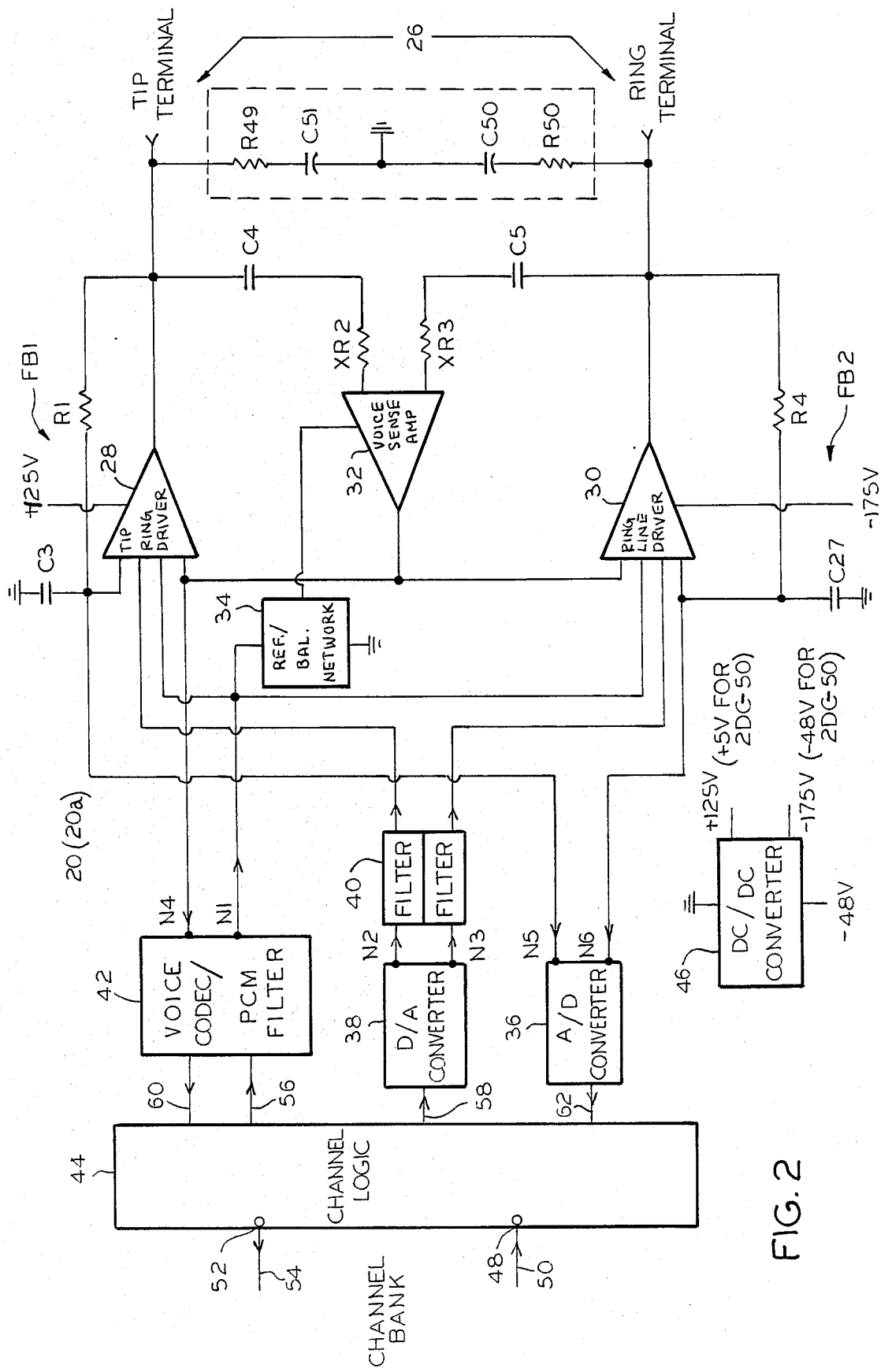
FIG. 2 is a simplified block diagram of a channel unit interface circuit constructed in accordance with the principles of the present invention.
Figure 4A:
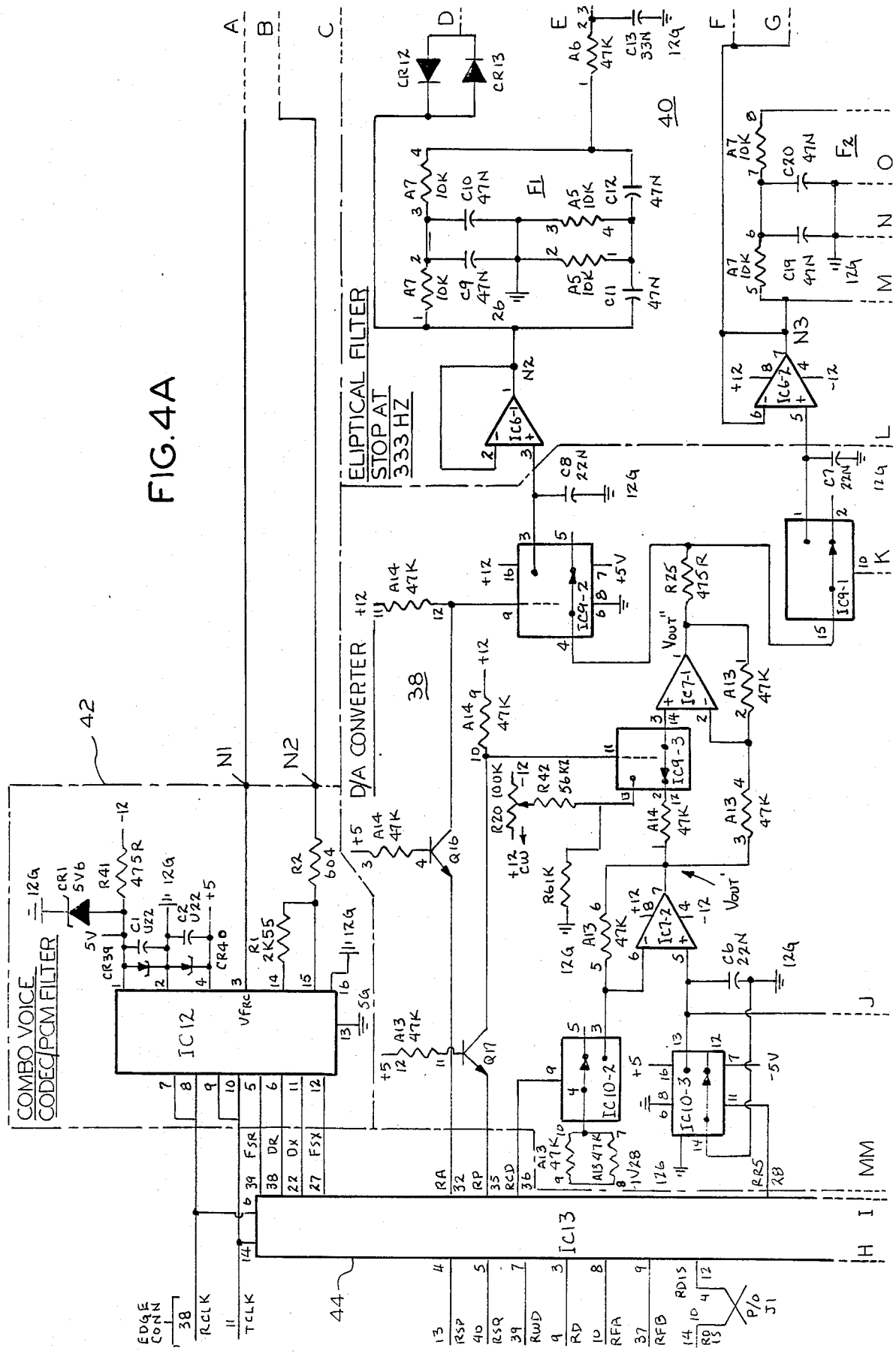
Figure 4B:
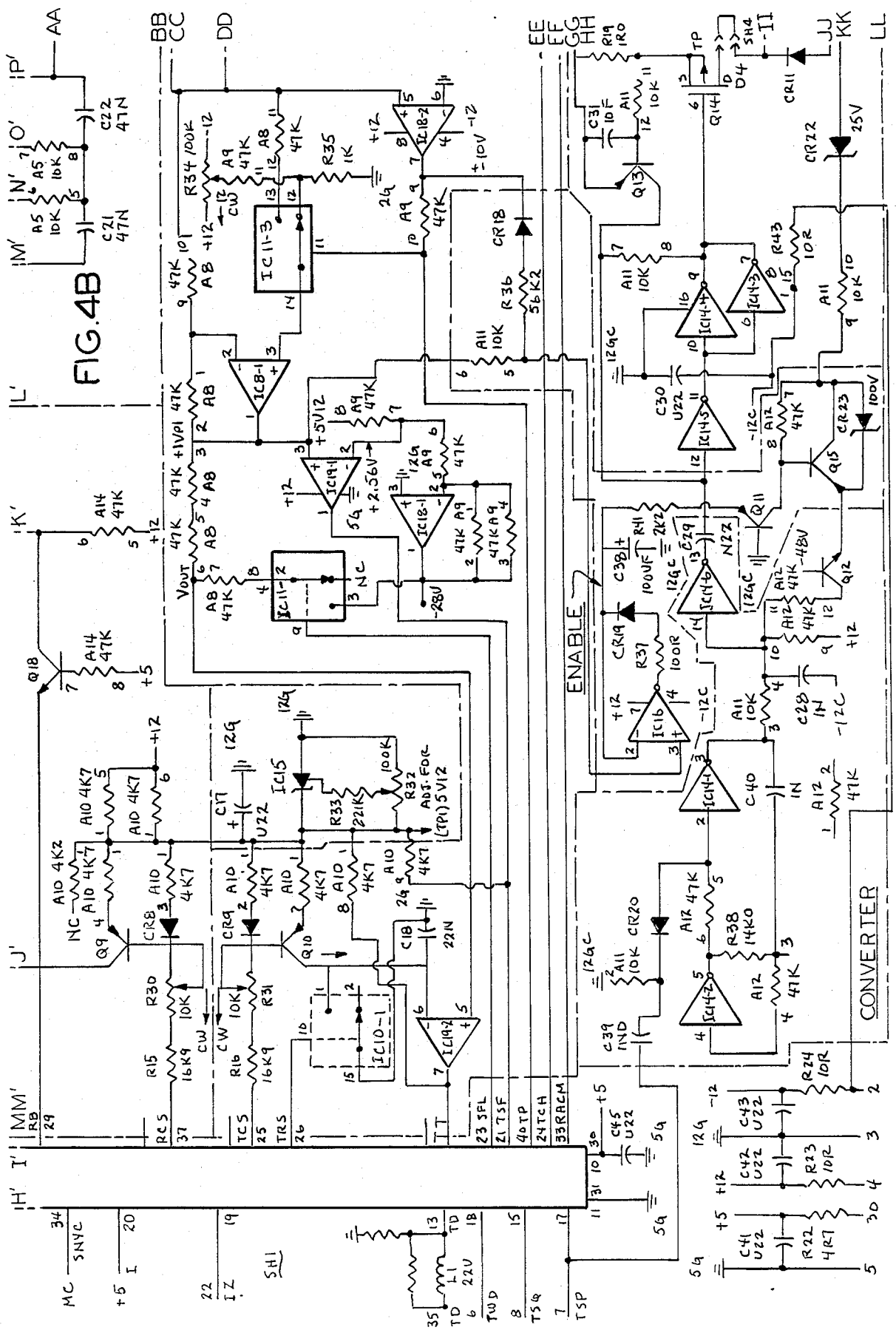
Figure 4D:
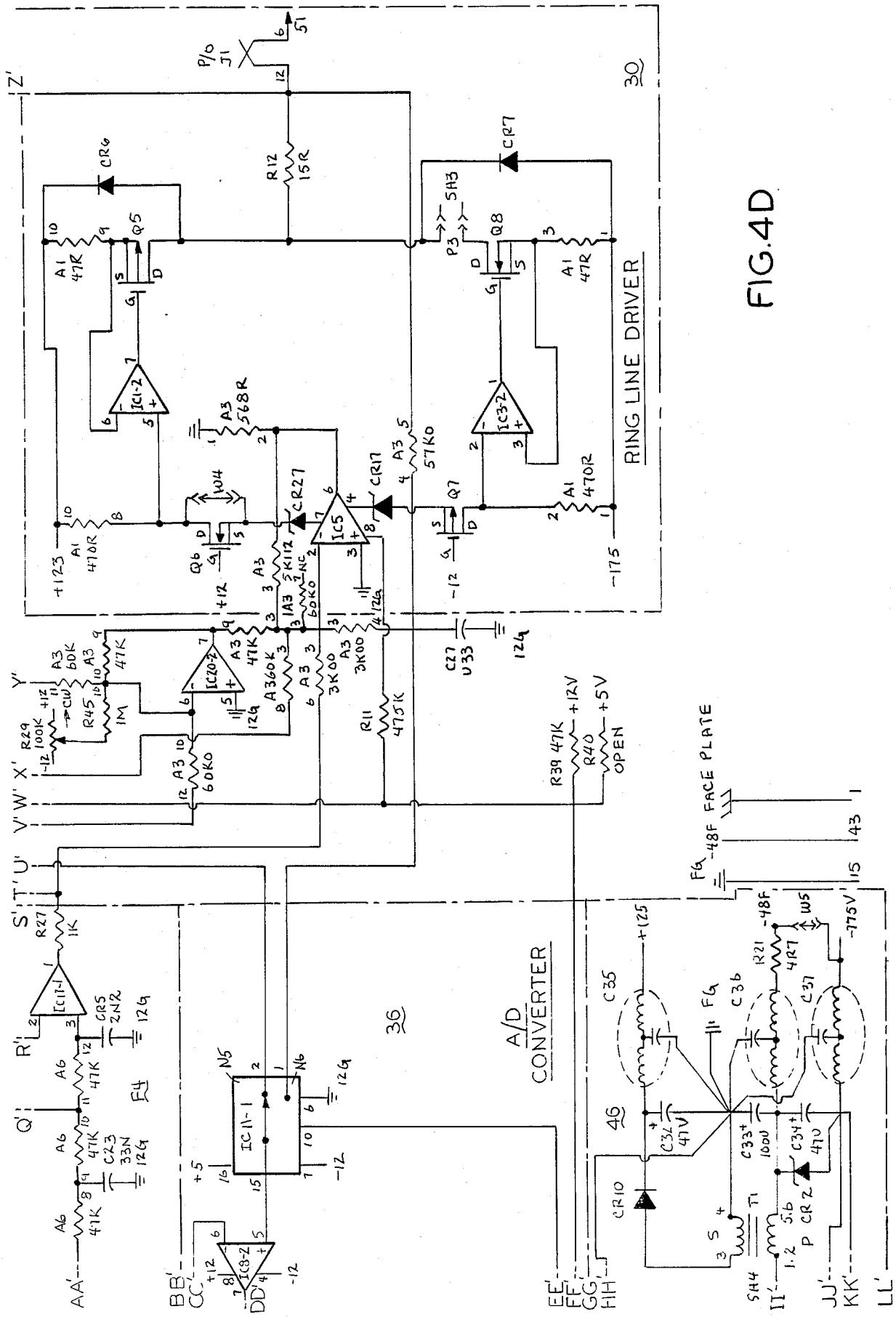

To this end, there is illustrated in FIG. 2 a simplified block diagram of the channel unit interface circuit 20 or 20a of FIG. 1 which is connected at each end of the cable 12 via the respective channel bank multiplexer 14 and 16. The interface circuit 20 has a bidirectional port 26 formed by a tip terminal and a ring terminal. The ring and tip terminals of the interface circuit 20 are connected to the alarm-detection equipment 22, and the tip and ring terminals of the interface circuit 20a are connected to the alarm-monitoring equipment 24.

The channel unit interface circuit 20 at location #1 includes a tip terminal line driver 28, a ring terminal line driver 30, a voice sense amplifier 32, a reference/balance network 34, an A/D signal processing circuit 36, a D/A signal processing circuit 38, a filter network 40, a voice codec (an acronym for coder/decoder)/PCM (pulse code modulation) filter 42, a channel logic block 44, and a DC-to-DC converter 46. For the purpose of simulation of the transmission line or cable, the frequency range is separated into two bands consisting of: (1) a DC to 60 Hz or DC band, and (2) a 200 Hz to 3.5 KHz or voice band.

Since the circuit design of the channel unit interface circuit 20a is the same as that of the channel unit interface circuit 20, like reference characters have been applied to designate like components or parts except the components of the interface circuit 20a have been suffixed by the letter "a" to distinguish them from the reference numerals used to identify the components of the interface circuit 20.

For the "voice band" operation, incoming differential signals (such as those originating at the equipment connected to location #1) applied to the bidirectional port 26 are converted by the voice sense amplifier 32 to unbalanced or single-ended signals for transmission to the voice codec/PCM filter 42. The codec/PCM filter 42 sends this "voice band" information over to the channel bank multiplexer 14 via the channel logic block 44. This "voice band" information is received at the codec 42a via the cable 12, the channel bank multiplexer 16, and the channel logic block 44a at location #2. Finally, the tip and ring terminal line drivers 28a and 30a are used to convert the unbalanced signals back to balanced (differential) signals for transmission out the tip and ring terminals which are connected to equipment at location #2. Further, the voice sense amplifier 32 is used to differentially drive the tip and ring line drivers 28 and 30 at location #1 to produce an AC input impedance. This AC input impedance is determined by the values of the resistors XR2, XR3 and capacitors C4, C5 and is defined to be the impedance seen looking across the tip and ring terminals. By proper selection, the AC input impedance is generated to be 600 ohms+- 2uf. Alternately, the AC input impedance could be provided by actual resistors and capacitors consisting of resistors R49, R50 and capacitors C50, C51.

In the DC to 60 Hz operation, incoming "DC band" frequency signals (those originating at the alarm-detection equipment connected to location #1) at the tip and ring terminals are not converted by the voice sense amplifier 32, but are transmitted separately by the A/D signal processing circuit 36 to the tip terminal line driver 28a and the ring terminal line driver 30a at location #2. "DC band" current signal from the tip terminal is determined by the voltage difference between the tip terminal voltage at location #1 and the tip terminal voltage at location #2. As a result, there is created a simulated impedance, which is typically designed to be 600 ohms, from the tip terminal at location #1 to the tip terminal at location #2. Similarly, the "DC band" current signal from the ring terminal is determined by the voltage difference between the ring terminal voltage at location #1 and the ring terminal voltage at location #2. As a result, there is created a simulated impedance, which is typically designed to be 600 ohms, from the ring terminal at location #1 to the ring terminal at location #2. Accordingly, this function is illustrated by the simplified representation in FIG. 3.

Referring now to FIGS. 4(a)-4(d), when connected together, there is shown a schematic circuit diagram of the interface circuit 20 of the present invention which illustrates detailed circuitry for use in the various blocks 28, 30, 32, 34, 36, 38, 40 and 46 of FIG. 2.

The tip terminal line driver 28 is a controlled current amplifier which provides a current gain of 100 from its input on pin 2 of operational amplifier IC2 and its output at the tip terminal via resistor R7. The current gain is achieved through two stages. The first stage includes the operational amplifier IC2, feedback resistor A2/2-3, and an output resistor A2/1-2. The feedback resistor A2/2-3 is connected between the inverting input of the amplifier IC2 and its output. The output resistor A2/1-2 is connected between the output of the amplifier IC2 and a ground potential. The output current $I_{OUT}$(+ or −) will be equal to the supply current and will be drawn from either the positive supply of +12 V or the negative supply of −12 V dependent upon the polarity of the input current $I_{in}$. Transistors Q7 and Q3 are connected as cascade amplifiers for high voltage operation. For a low voltage design, the transistor Q7 is replaced by a wire W3 since it is not required. Thus, the output voltage $V_{OUT}$ will be equal to $I_{OUT}$ times the parallel combination of the resistors A2/2-3 and A2/1-2. With the resistor A2/2-3 having a value of 5.11K ohms and the resistor A2/1-2 having a value of 568 ohms, the output voltage is given by:

$$V_{OUT}=I_{OUT}(5.11K\Omega \| 568\Omega) \quad (1)$$

Also, the output voltage is equal to the input current $I_{in}$ multiplied by the value of the resistor A2/2-3. Thus:

$$V_{OUT}=I_{in}(5.11K\Omega) \quad (2)$$

By combining equations (1) and (2) and solving for $I_{OUT}$, there is shown a gain of 10 as follows:

$$I_{OUT} = \frac{I_{in}(5.11K\Omega)}{(5.11K\Omega \| 568\Omega)} \approx 10\, I_{in} \quad (3)$$

If a positive current is generated by amplifier IC2, the second stage includes an operational amplifier IC1-1, a resistor A1/6-10 and a resistor A1/7-10. The positive supply current having a magnitude of $I_{OUT}$ provides a voltage drop across the resistor A1/6-10 (470 ohm). Since the amplifier IC1-1 will maintain 0 Volts across its inverting and non-inverting inputs, an equal voltage will be applied across the resistor A1/7-10 (47 ohm). As a result, the total output current $I_T$ at the tip terminal will be:

$$I_T = \frac{I_{OUT}(470\text{ ohm})}{47\text{ ohm}} = 10\, I_{OUT} \quad (4)$$

By substituting the $I_{OUT}$ from equation (3) into equation (4), the total current is:

$$I_T=10(10I_{in})=100I_{in} \quad (5)$$

On the other hand, if a negative supply current is generated by the amplifier IC2, the second stage of gain is provided by operational amplifier IC3-1, a resistor A1/1-5 and a resistor A1/1-4. The operational amplifier IC3-1 operates similarly on the resistors A1/1-5 and A1/1-4 so as to generate a total current gain of 100 at the tip terminal.

The field-effect transistors Q1 and Q4 permit the voltage applied to the tip terminal to swing between the full supply voltage while maintaining the total current $I_T$ through either the resistor A1/7-10 or A1/1-4. The supply current for IC1 and IC3 is generated by a transistor Q19, a diode CR4, and a resistor R5. The resistor R5 causes +12 V to be developed across the Zener diode CR4 and the transistor Q19 functions as an emitter follower for buffering the +12 volts applied to the operational amplifier IC3-1. Since current drawn by the amplifier IC3-1 is always larger than the current drawn by the amplifier IC1-1, this current in the amplifier IC3-1 is transferred via the collector of the transistor Q19 to the Zener diode CR3 which regulates the +12 V applied to the amplifier IC1-1. The capacitor C44 is connected across the diode CR3 to filter out noise so as to maintain stable regulation at high frequencies. A bidirectional diode CR24 is used to lower the supply voltage by two volts, thereby maintaining the voltage swing on the inputs of the amplifier IC1-1 within its dynamic range.

The ring line driver 30 is a controlled current amplifier which provides a current gain of 100 from its input on pin 2 of operational amplifier IC5 to its output at the ring terminal via resistor R12. The ring line driver 30 is constructed and operates in an identical manner as the tip terminal line driver 28. In particular, the ring line driver 30 has two stages of gain. A first stage is formed by the operational amplifier IC5, feedback resistor A3/3-2, and an output resistor A3/1-2. A second stage of gain is formed by either operational amplifier IC1-2, resistor A1/8-10, and A1/9-10, or operational amplifier IC3-2, resistor A/1-2, and resistor A1/1-3 dependent upon whether the current $I_{OUT}$ from the amplifier IC5 is drawn from the positive supply or the negative supply.

The voltage sense amplifier 32 includes an operational amplifier IC4-1 which is used to receive the incoming differential "voice band" frequency signals applied across the tip and ring terminals at its inputs. The non-inverting input of the amplifier IC4-1 is connected via series connection of the resistor A4/11-2 and the capacitor C4 to the tip terminal. The inverting input of the amplifier IC4-1 is connected via a series connection of the resistor A4/1-2 and the capacitor C5 to the ring terminal. The capacitors C4 and C5 are used to block the DC signals and function with the respective series resistors in generating the AC input source impedance of 600 ohms+2 uf. Capacitors C26 and C46 are provided to attenuate very high frequencies and have a negligible effect on the operation of the amplifier IC4-1 in the "voice band" range. The differential signals applied to the tip and ring terminals are normally at a 0 dBm level, and the amplifier IC4-1 has a gain of 1. The output of the amplifier IC4-1 is connected to the "codec" 42 via a resistor divider formed by resistors R13 and R14. For the values shown, there is provided an attenuation of 2.5 dB. Further, these same resistors also form a source impedance of 600 ohms which provide an additional attenuation of 6 dB when loaded by the input resistor R2 coupled to the codec 42 (IC12). Thus, the level at the pins 1 and 7 of jack J1 is equal to the standard test level of $(-2.5 \text{ dBm})+(-6 \text{ dBm})= -8.5$ dBm. The input resistor R2 and the feedback resistor R1 are operatively connected to an internal operational amplifier in the "codec" IC12 so as to provide a 12.5 dB gain. As a result, the analog input of the "codec" IC12 receives a 4 dBm level $(-8.5+12.5)$ which is required by the "codec."

Figure 5:
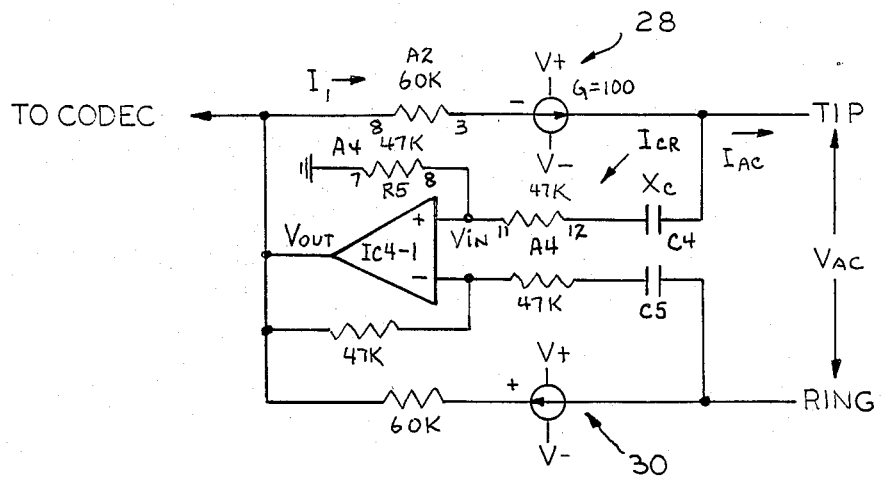
FIG. 5 is a simplified circuit of a portion of the channel unit interface circuit useful in calculating the AC input impedance.

For the 200 Hz to 3.5 KHz or "voice band" operation, the input impedance is calculated from the simplified circuit of the voice sense amplifier shown in FIG. 5. The AC input impedance across the tip and ring terminals is produced by the amplifier IC4-1, the resistor A2/3-8, and the line driver 28 and associated circuitry. When a voltage $V_{AC}$ is applied across the tip and ring terminals, the line driver 28 produces an output current $I_{AC}$ which is equal to:

$$I_{AC} = V_{AC} \times \frac{47K}{X_C + 47K} \times \frac{100}{60K} \qquad (6)$$

The AC input source impedance $Z_{AC}$ is equal to $V_{AC}/I_{AC}$. Solving equation (6) for $V_{AC}/I_{AC}$, the AC input impedance across the tip and ring terminals is found to be:

$$Z_{AC} = \frac{V_{AC}}{I_{AC}} = \frac{(X_C + 47K)\,60K}{(47K)\,100} = \frac{60K}{100} + \frac{X_C(60)}{47(100)} \qquad (7)$$

The first term is equal to 600 ohms, and the second term is made to be somewhat less than 2 uf by the selection of the value of the capacitance C4. Thus, it has been shown that the AC input impedance generated can indeed be made equal to 600 ohms+2 uf.

Alternately, the AC input impedance could be provided by actual resistors and capacitors consisting of the resistors R49, R50 and the capacitors C50, C51. In this case, jumper wires W6 and W7 as shown on FIG. 4 are removed to disconnect the simulated AC input impedance. Another optional would be to form the AC input impedance by using a combination of simulated and real impedances.

Analog signals of +4 db level from the output of the codec IC12 at pin 3 are applied to pin 3 of operational amplifier IC20-1 via a resistor R4 normally having a value of 0 ohms. The resistor R4 allows for the capability of a level adjustment. The resistor R3 connected to the non-inverting input of the amplifier IC20-1 terminates the receive path of the 4-wire circuit in approximately 600 ohms. The amplifier IC20-1 functions as a buffer and drives the tip and ring terminals with effectively 600 ohms and drives the balance network 34 that is utilized to perform the cancellation of the resulting signal applied to the amplifier IC4-1. By assuming that a termination of $R_L$ having a value of 600 ohms is applied across the tip and ring terminals, there is shown a simplified receive-path circuit in FIG. 6.

Figure 6:
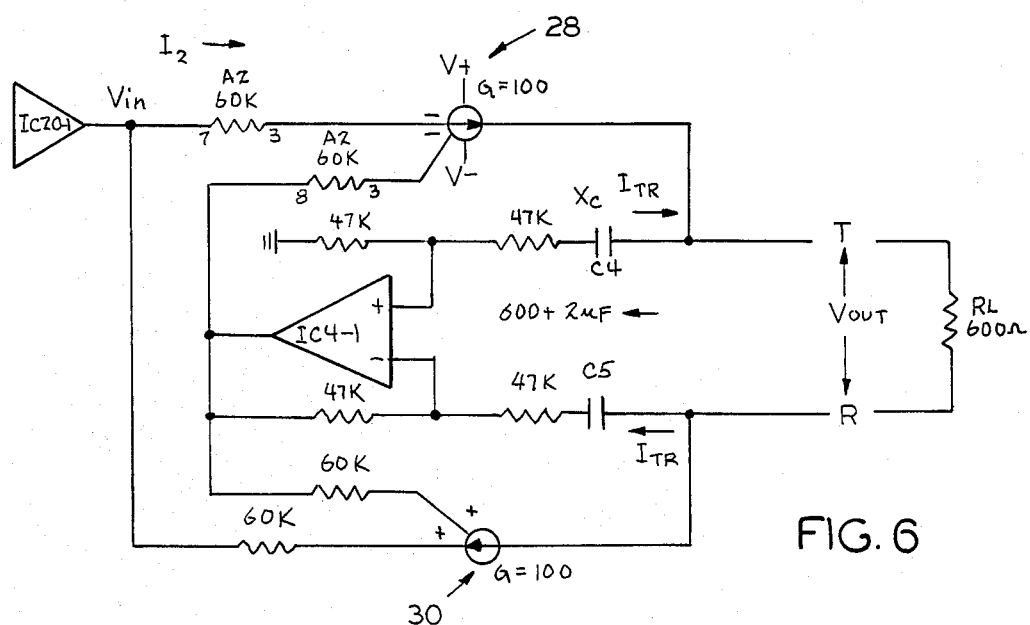
FIG. 6 is a simplified circuit of a portion of the channel unit interface circuit useful in calculating the simulated differential drive source impedance.

The simulated differential source impedance can be calculated from FIG. 6 as follows. The tip-to-ring current $I_{TR}$ is equal to the current $I_2$ through the resistor A2/7-3 times the current gain of 100 due to the tip line driver 28. In other words, $$I_{TR} = I_2(100) = \frac{V_{in}(100)}{60K} \text{ where } I_2 = \frac{V_{in}}{60K} \qquad (11)$$

The source impedance $R_S$ is equal to $V_{in}/I_{TR}$. Thus, solving the equation (11) for $V_{in}/I_{TR}$, there is given:

$$R_S = \frac{V_{in}}{I_{TR}} = \frac{60K}{100} = 600 \text{ ohms} \qquad (12)$$

The combination of the load termination of $R_L$ (600 ohms) and the input impedance generated by amplifier IC4-1 or 600 ohms provides an effective load of 300 ohms. Therefore, the output voltage $V_{OUT}$ can be calculated to be even more simply:

$$V_{OUT} = I_{TR}(300 \, \Omega) \tag{13}$$

By substituting $I_{TR}$ from equation (11) into equation (13), there is given:

$$V_{OUT} = \frac{V_{in}(100)}{60K}(300\Omega) = \frac{V_{in}}{2} \tag{14}$$

Therefore, the output voice band level will:

$$(+4 \, dBm) - (6 \, dBm) = -2 \, dBm$$

Referring to FIGS. 2 and 4, there is shown a signal receive port 48 which is connectible via line 50 to a first signal transmission path of the channel bank (four-wire circuit) for receiving both encoded incoming "DC band" frequency signals and incoming "voice band" frequency signals. A signal transmit-out port 52 is connectible via a line 54 to a second signal transmission path of the channel bank for supplying both outgoing tip and ring terminals "DC band" frequency signals and outgoing "voice band" frequency signals. The incoming signals at the receive port 48 are separated by the channel logic block 44 into incoming "voice band" frequency signals which are applied to the codec 42 via line 56 and incoming tip and ring terminals "DC band" frequency signals which are applied to the D/A signal processing circuit 38 via line 58. The incoming "voice band" frequency signals appear at a first node N1 connected to the codec 42 and are sent to the tip and ring terminals via respective tip and ring terminal line drivers 28 and 30 as described previously. With respect to the incoming tip and ring terminals "DC band" frequency signals, the circuit 38 causes the incoming tip terminal "DC band" signals to appear at second node N2 and the incoming ring terminal "DC band" signals to appear at a third node N3. The signals at the nodes N2 and N3 are sent separately to the tip and ring terminals via the respective tip and ring terminal line drivers 28 and 30.

With respect to the incoming differential "voice band" frequency signals applied to the bidirectional port 26, it will be recalled that they are converted to single-ended outgoing "voice band" frequency signals by the voice sense amplifier 32 and are sent to the codec 42 at node N4. These outgoing "voice band" frequency signals are then sent from the codec 42 to the channel logic block 44 via the line 60.

With respect to the incoming tip and ring terminal "DC band" frequency signals applied to the port 26, they are sent separately via respective first and second feedback impedance networks FB1 and FB2 to the A/D signal processing circuit 36 at corresponding nodes N5 and N6. The outgoing tip and ring terminal "DC band" frequency signals are converted to the outgoing "DC band" frequency signals and are sent to the channel logic block 4 via line 62. The channel logic block 44 processes the signals from the codec 42 and the circuit 36 for transmission over the second signal path via the line 54.

It will be noted that in order to cancel the signal at the input of the voice sense amplifier 32 or amplifier IC4-1 due to the signals arriving at the pin 9 of the jack J1 (node N1) from the receive path so that they are prevented from being returned to the transmit path via the pin 1 of jack J1 (node N4), there is needed the balance network 34 which is required to have a source resistance of 600 ohms (R8) and a signal equal in magnitude to $V_{in}/2$ but opposite in phase when terminated with 600 ohms (R9). These conditions are determined from equations (12) and (14) above.

Figure 7:
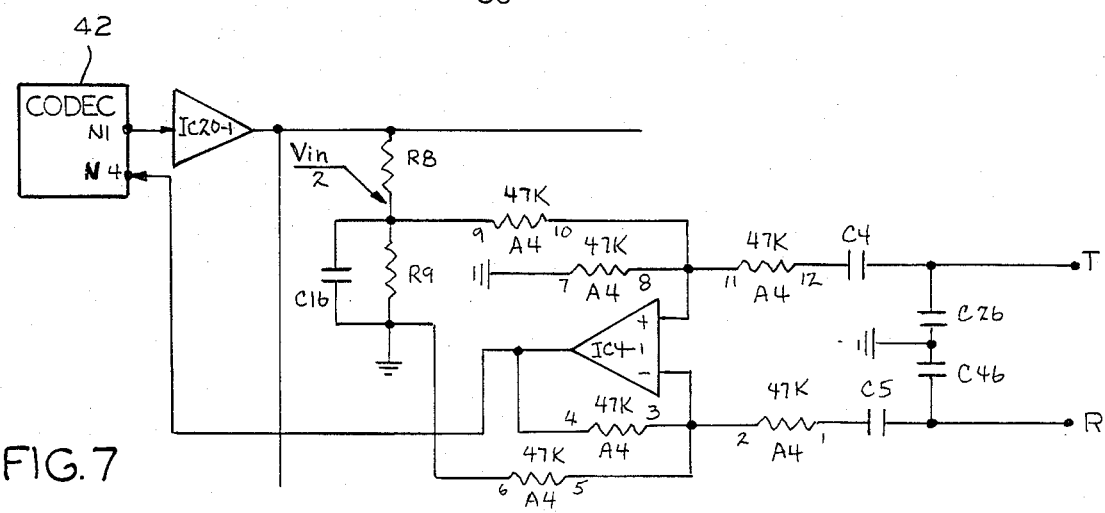
FIG. 7 is a simplified schematic circuit diagram of the balancing network and the voice sense amplifier with associated components useful in explaining the cancellation operation.

A simplified schematic circuit diagram of the balance network 34 and the voice sense amplifier 32 (IC4-1) functioning as a cancellation amplifier with their associated components are shown in FIG. 7. The amplifier IC4-1 is connected so that the voltage developed across the resistor R9 will cancel the line voltage sensed through the capacitors C4 and C5 when the resistance value of the resistor R9 is equal to the load termination $R_L$. As a result, the amplifier IC4-1 will not be responsive to the signal arriving from amplifier IC20-1. The capacitor C16 is used to simulate the load effects due to the capacitors C26 and C46 being coupled across the load termination $R_L$. While the resistors A4/5-6 and A4/8-7 could have been eliminated due to the differential configuration of the amplifier IC4-1, they have been included so as to improve its dynamic input range by attenuating the longitudinal incoming signals from the line.

The connection of the signal path from the balance network 34 to the non-inverting input of the amplifier IC4-1 for error cancellation establishes an additional, undesired signal path through resistor A2/8-3 (FIG. 4) for conducting the signal from the output of the amplifier IC4-1 to the inverting input of amplifier IC2 which is the input of the tip terminal line drive 28. The magnitude of the current error developed by this undesired signal path is dependent upon the size of the resistor A2/8-3 times the current gain of 100 from the tip terminal line driver. A resistor A2/10-11 and an inverting amplifier IC4-2 having a gain of 1 are connected between the output of the balance network and the inverting input of the amplifier IC2 to apply a signal equal in magnitude to the current error signal but opposite in phase so as to thus cancel the error. Therefore, the current error signal created by the undesired path through the resistor A2/8-3 has no effect on the output level of the tip terminal line driver 28. With respect to the ring terminal line driver 30, the inputs thereto are normally inverted by the amplifier IC20-2 so that the ring terminal current will flow in a direction opposite to the tip terminal current. Therefore, in order to cancel the current error through the resistor A3/10-11, a resistor A3/8-3 is connected directly from the output of the balance network to the inverting input of the amplifier IC5 which is the input of the ring terminal line driver 30.

The channel logic block 44 (IC13) provides the proper address decoding for reception and transmission on the respective lines 50 and 54. The channel logic 44 interfaces with the codec/PCM filter 42 (IC12) for the voice information and generates interface and control signals for the necessary D/A and A/D conversions. In the receive mode, the channel logic 44 is addressed when the three address lines (RSP, RSQ, RWD) on pins 4, 5 and 7 are high simultaneously. When the channel logic is addressed, it will generate a frame synchronizing pulse FSr for the codec 42. In the transmit mode, there are also three address lines (TSP, TSQ, TWD) on pins 7, 8 and 6. When these address lines are high simultaneously, the channel logic is addressed to generate a frame synchronizing pulse FSx to the codec. The channel logic receives data from the codec and delivers the data to the line 54 via the signal transmit-out port 52.

The channel logic keeps track of the data being transmitted and instead of transmitting the eighth bit in each 8-bit byte from the codec, the eighth bit is substituted by the low frequency data to be transmitted. These eighth bits are grouped to form the low frequency data frames each formed of 12 bits consisting of a synchronizing bit, a polarity bit, a scale factor bit and 9 bits representing the amplitude.

In order to assure that each bit in the 12-bit data stream is used for its intended purpose, a synchronization pattern is used. The sync bit pattern is 8 bits long and is made up of the following sequence of 10001110. This pattern has the property that if any three consecutive bits are known then the location in the pattern is known. Each twelfth bit in each of the low frequency data frames represents a sync bit.

The codec/PCM filter 42 (IC12) is the type similar to ETC 5054 which is commercially available from Intel Corporation. The filter IC12 filters the analog incoming voice band frequency signals applied on its pin 15 (node N4) with a 200 Hz to 3,400 Hz band-pass filter. The filtered signal is encoded into an 8-bit PCM format and is sent out as a signal Dx at pin 11 for transmission over the second signal path via the channel interface logic 44 (IC13). The channel logic IC13 also generates the frame synchronizing pulse FSx on pin 12 of the codec which enables a transmit 1.544 MHz clock signal TCLK received at pins 9 and 10. This clock signal causes the signal Dx in PCM format to be shifted out at pin 11. Digital incoming voice frequency signals from the channel logic IC13 are applied to the pin 6 of the codec as pulsed signals Dr. The channel logic block 44 also sends the frame synchronizing pulse FSr to pin 5 of the codec which enables a receive 1.544 MHz clock signal RCLK applied to pins 7 and 8. The RCLK signal causes the pulse signals Dr to be shifted into the codec IC12. The pulsed signals Dr are converted to an analog signal via a filter and a power amplifier and is driven out on pin 3 (node N1) as a signal VFro.

Figure 8:
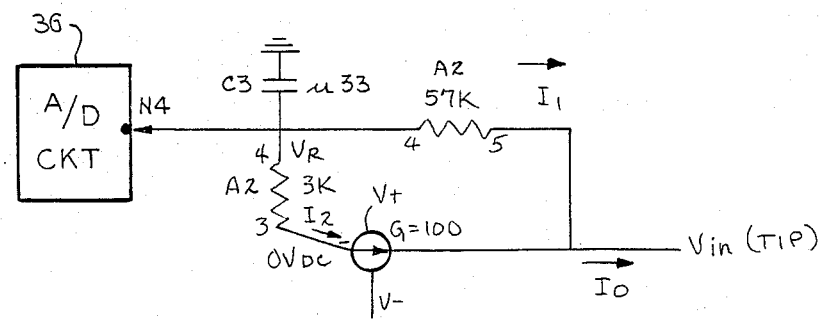
FIG. 8 is a simplified circuit of a portion of the channel unit interface circuit useful in calculating the dc band input impedance.

It will be recalled that the capacitors C4 and C5 block dc signals. Thus, the dc to 60 Hz or "DC band" signals applied to the tip and ring terminals will not be transmitted by the voice sense amplifier IC4-1, but will be treated separately. Since the dc to 60 Hz operation is identical for the tip and ring terminal line drivers, it will be necessary only to discuss the operation of the tip terminal line driver 28. The incoming tip terminal "DC band" frequency signals representative of alarm signals from alarm-detection equipment located at the customer's site are received at the tip terminal pin 24. These "DC band" signals are fed to the input of the tip line driver 28 via voltage divider formed by resistors A2/4-5 and A2/4-3. The tip terminal "DC band" signals are also sent to the input of the A/D signal processing circuit at node N5 via the first feedback impedance network FB1 (resistor A2/4-5 and capacitor C3). The capacitor C3 is connected between the junction of the resistors A2/4-5 and A2/4-3 and the ground potential for elimination the "voice band" frequency signals. The initial input impedance for "DC band" operation can be calculated from the simplified transmit-path circuit of the FIG. 8. The current $I_1$ flowing through the resistor A2/4-5 in series with the parallel combination of the capacitor C3 an the resistor A2/4-3 is equal to the input voltage Vin divided by the total impedance. This is given by:

$$I_1 = \frac{V_{in}}{57K + \frac{3K(1/sC3)}{3K + 1/sC3}} \quad (15)$$

The current $I_2$ flowing into the tip line driver 28 is equal to the voltage $V_R$ across the parallel combination of the capacitor C3 and the resistor A2/4-3 divided by the resistor A2/4-3. Further, the voltage $V_R$ is equal to the current $I_1$ times the parallel impedance of the capacitor C3 and the resistor A2/4-3. Thus, $$V_R = I_1 \times \frac{3K(1/sC3)}{3K + 1/sC3} \quad (16)$$

$$\text{and } I_2 = \frac{V_R}{3K} = \frac{I_1 \times \frac{3K(1/sC3)}{3K + 1/sC3}}{3K} \quad (17)$$

Further, the output current $I_0$ is equal to the current $I_2$ times the current gain of 100 from the tip line driver. Therefore, $$I_0 = I_2(100) \quad (18)$$

By using equations (15), (16) and (17), there is given:

$$I_0 = \frac{I_1 \times \frac{3K(1/sC3)}{3K + 1/sC3}}{3K} (100)$$
$$= \frac{V_{in}}{\frac{57K + 3K(1/sC3)}{3K + 1/sC3}} \times \frac{\frac{3K(1/sC3)}{3K + 1/sC3}}{3K} (100) \quad (19)$$

By solving equation (19) for $V_{in}$ divided by $I_0$, which is defined to be the input impedance, and simplifying, there is given:

$$\frac{V_{in}}{I_0} = \frac{57K + 3K}{100} + \frac{57K + 3K}{100}(sC3) = \quad (20)$$

$$600 \text{ ohms} + .56 \text{ Hys}$$

Accordingly, it can be seen that the capacitor C3 appears as a series inductor of 0.56 Hys which is used to decouple the voice band frequencies.

Figure 9:
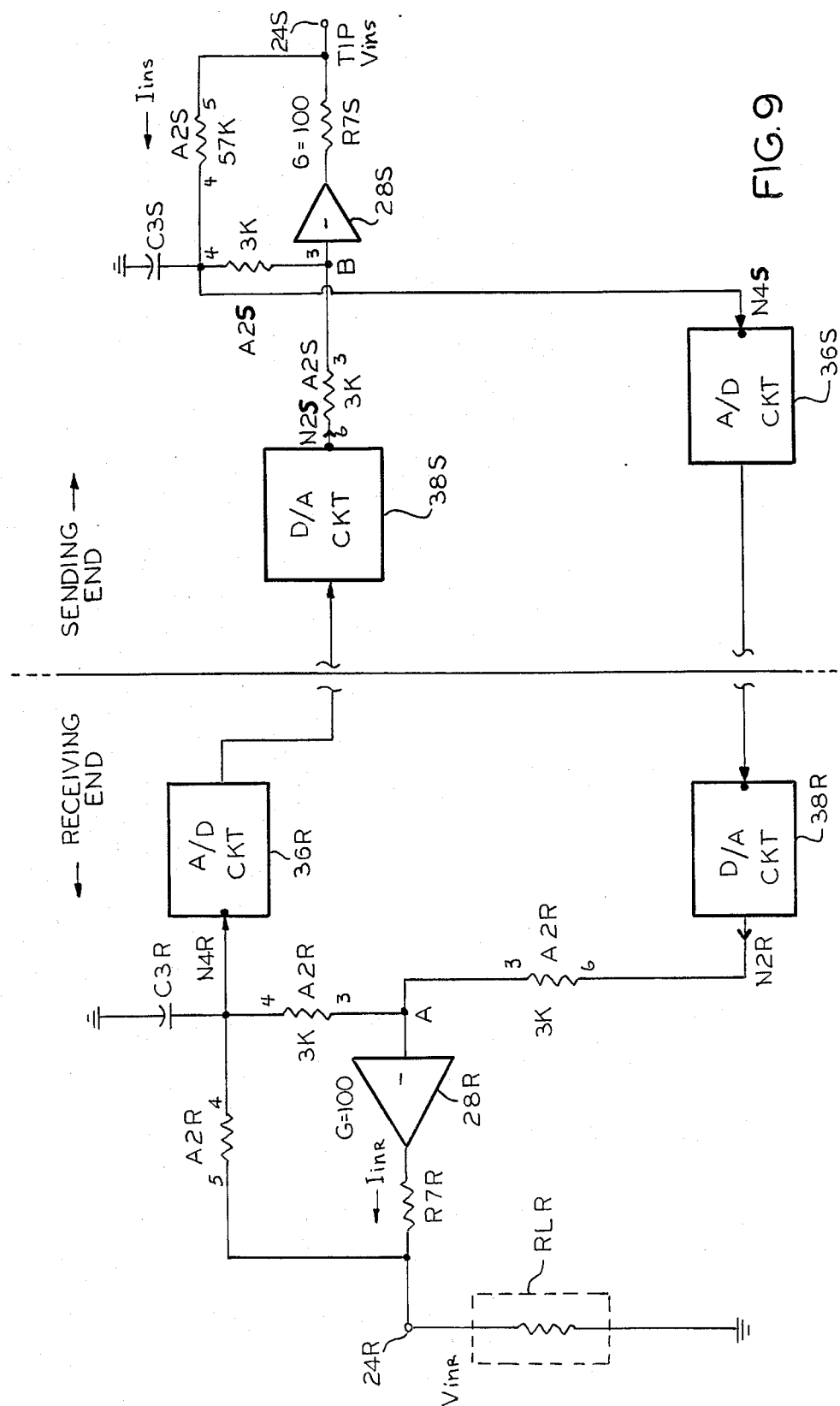
FIG. 9 is a simplified circuit showing portions of a channel unit interface circuit at each end of a communication system.

In order to show that the channel unit interface circuit 20 does indeed form the simulated series tip impedance of 600 ohms as shown in FIG. 2 for the "DC band" frequency signals, there is illustrated in FIG. 9 a portion of the tip terminal line driver or current source 28S and its associated components at sending or originating end and a portion of the tip terminal line driver 28R and its associated components at the receiving end. A voltage $V_{ins}$ is applied to the tip terminal 24S and is attenuated by the voltage divider formed by the resistors A2S/4-5 and A2S/4-3. Thus, the voltage $V_{A/DS}$ applied at the node N4S of the A/D signal processing circuit 36S is equal to:

$$V_{A/DS} = V_{ins} \frac{3K}{3K + 57K} = \frac{V_{ins}}{20} \quad (21)$$

The voltage divider attenuates the high voltage signals varying between −200 volts and +100 volts which are received at the tip terminal 24S to be between −10 and +5 volts for accommodating the dynamic range of the switch IC11 at the input of the circuit 36S. The initial tip terminal sending current $I_{ins}$ will reach its steady state tip terminal current as the capacitor C3S is charged up. Thus, $I_{ins}$ is equal to $V_{A/DS}$ divided by the resistor A2S/4-3 multiplied by the current gain of 100 from the tip line driver 28S. This can be expressed mathematically as follows:

$$I_{ins} = \frac{V_{A/DS}}{3K} \times 100 = \frac{V_{ins}}{20(3K)} (100) = \frac{V_{ins}}{600 \text{ ohms}} \quad (22)$$

The signals received at the receiving end are inverted by the D/A signal processing circuit 38R to produce an output voltage at node N2R which is equal to:

$$V_{D/AR} = -V_{A/DS} = \frac{-V_{ins}}{20} \quad (23)$$

Thus, the initial receiving current $I_{inr}$ will be equal to:

$$I_{inR} = \frac{V_{D/AR}}{3K}(100) = \frac{-V_{ins}}{20} \cdot \frac{1}{3K}(100) = \frac{-V_{ins}}{600 \text{ ohms}} \quad (24)$$

The channel unit interface circuit 20 will now be shown to simulate a transmission line for the cases where the tip terminal 24R at the receiving end is open-circuited, short-circuited, and connected through a 600 ohm load to ground. For the open-circuit case, the tip terminal 24R is left open or unconnected. Reference is made to the waveforms shown in FIGS. 10(a) through 10(h) depicting the signal at various points in FIG. 9, which is useful in understanding the explanation of the open-circuit case.

Figure 10:
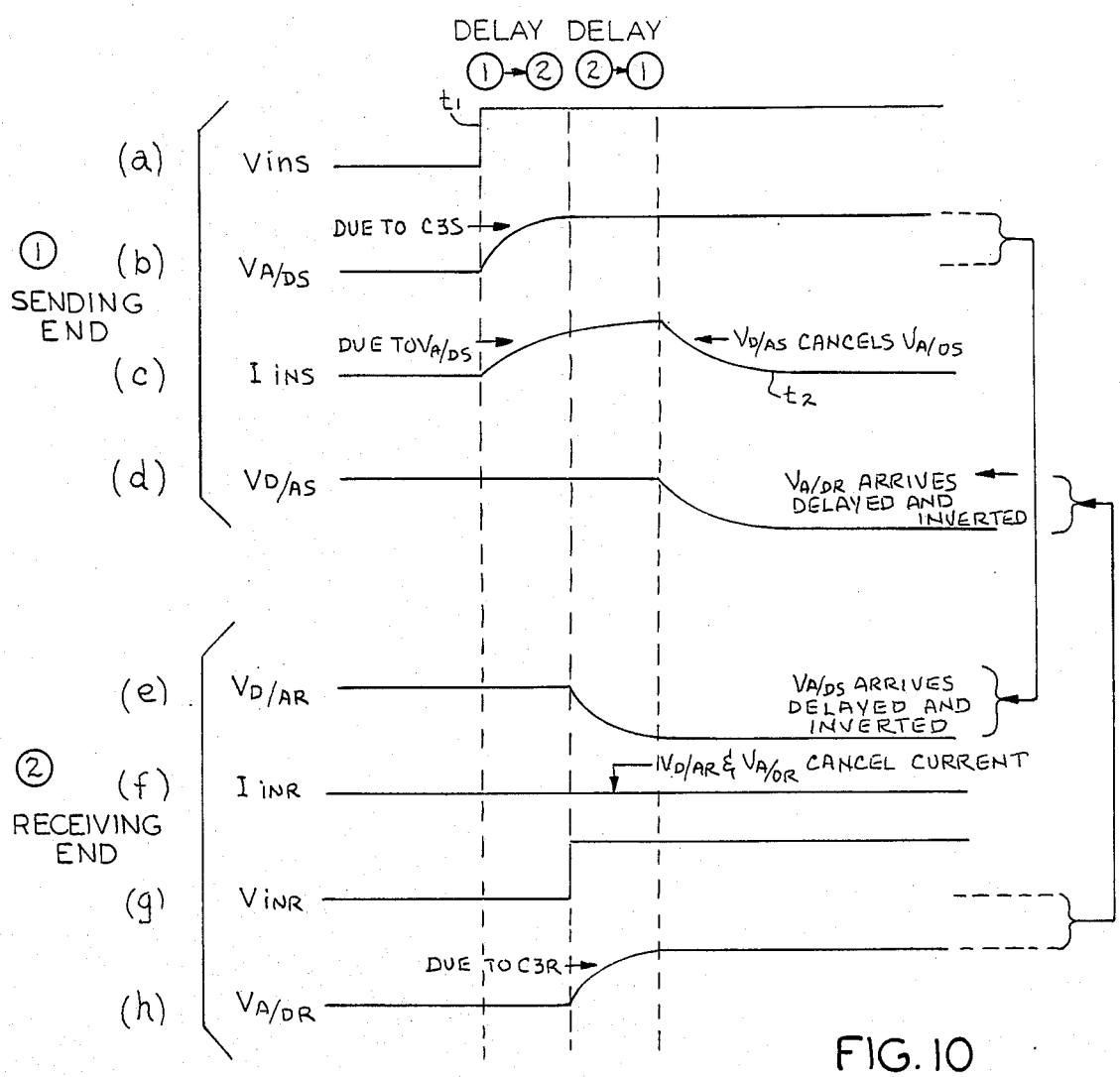
FIGS. 10(a) through 10(h) are waveforms useful in understanding the operation of the circuit shown in FIG. 9 for the open-circuit operation.

With a voltage $V_{ins}$ applied to the tip terminal 24S at the sending end at the time t1 shown in FIG. 10(a), the voltage $V_{A/DS}$ at the circuit 36S and the tip current $I_{ins}$ at pin 24S are shown in FIGS. 10(b) and 10(c) respectively. The voltage $V_{A/DS}$ is generated after a first delay by the capacitor C3S and is inverted at the receiving end by the D/A circuit 38R. The output of the circuit 38R (node N2R) is shown in FIG. 10(e) and causes the voltage $V_{inr}$ at the receiving end to rise immediately, as shown in FIG. 10(g). As a result, the current $I_{inr}$ at the receiving end will flow through the resistors R7R, A2R/5-4 and A2R/4-3 after a second delay by the capacitor C3R. When the voltage on the capacitor C3R is charged to $V_{ins}/20$, the current through the resistor A2R/4-3 will cancel the current through the resistor A2R/6-3 so as to turn off the current source 28R. This tip terminal current $I_{inr}$ is shown in FIG. 10(f).

Further, the voltage $V_{A/DR}$ or $V_{ins}/20$ shown in FIG. 10(h) is sent back to the originating end and appears at the output of the circuit 38S (node N2S) as $V_{D/AS}$ in its inverted form equal to $-V_{ins}/20$. This voltage $V_{D/AS}$ is shown in FIG. 10(d). Since the voltage $V_{D/AS}$ is now equal in magnitude but opposite in polarity to the voltage $V_{A/DS}$, the currents through the resistors A2S/4-3 and A2S/6-3 will cancel and cause the current source 28S to turn off. Thus, the final tip terminal current at the sending end is shown in FIG. 10(c) at the time t2. As proved, when a voltage $V_{ins}$ is applied at the sending end of the interface circuit 20 the voltage $V_{inr}$, which is equal to the voltage $V_{ins}$, appears at the receiving end after a delay and no current will flow at either the sending or receiving end. This is the exact result that would be expected from a transmission line with an open-circuited receiving end.

For the short-circuited case, the tip terminal current $I_{inr}$ at the receiving end will not flow through the resistors A2R/5-4 and A2R/4-3 but will flow directly to ground. Thus, the initial current at the sending end is maintained at the receiving end. Further, no voltage will be sent back to the originating end via the circuits 36R and 38S. As a result, the initial current at the sending end is unchanged. Accordingly, when the voltage $V_{ins}$ is applied to the sending end of the interface circuit 20 a current of $I_{ins} = V_{ins}/600$ ohms is induced and the same current $I_{inr} = -V_{inr}/600$ ohms will appear at the receiving end after a delay. Thus, the resistance of the transmission line has been again simulated.

For the case when the receiving end is terminated with a load impedance of $R_{LR}$ of 600 ohms, the tip terminal current $I_{inr}$ will begin to flow into the resistor $R_{LR}$ so as to cause the tip terminal voltage $V_{inr}$ to rise. When this voltage $V_{inr}$ is equal to $V_{ins}/2$, the tip current $I_{inr}$ will be equal to the sum of the currents at node A due to the resistors A2R/4-3 and A2R/6-3 times the current gain of 100 from the current source 28R. Thus, the tip terminal current $I_{inr}$ has been reduced to a value of:

$$I_{inr} = \frac{-V_{ins}}{20} \cdot \frac{1}{3K} + \frac{V_{ins}/2}{20} \cdot \frac{1}{3K}(100) = \frac{-V_{in}/2}{600 \text{ ohms}} \quad (25)$$

As a result, the point of equilibrium is reached since the current through the input impedance of 600 ohms will be equal to the current through the load impedance $R_{LR}$ of 600 ohms. Further, this same voltage $V_{ins}/2$ at the tip receiving terminal is transformed to a level of $V_{ins}/40$ at the input of the circuit 36R which is sent back to the circuit 38S at the originating end. This circuit 38S inverts the input signal to produce an output signal $V_{D/AS}$ at node N2S which is equal to:

$$V_{D/AS} = -V_{ins}/40 \quad (26)$$

Consequently, the tip terminal current $I_{ins}$ at the originating end will be equal to the sum of the currents at node B due to the resistors A2S/4-:3 and A2S/6-3 times the current gain of 100 from the current source 28S. Thus, the tip terminal current is reduced to the value of:

$$I_{ins} = \frac{V_{A/DS}}{3K} + \frac{V_{D/AS}}{3K} \times 100$$
$$= \frac{V_{ins}}{20} \cdot \frac{1}{3K} + \frac{-V_{ins}}{40} \cdot \frac{1}{3K} \cdot 100 = \frac{V_{ins}/2}{600 \text{ ohms}} \quad (27)$$

Accordingly, when the voltage $V_{ins}$ is applied to the sending end of the interface circuit 20 and the receiving end is terminated with the 600 ohm load, the tip terminal current at the sending end would be expected to be equal to the applied voltage $V_{ins}$ divided by 1200 ohms which is the sum of the 600 ohms due to the transmission line and the 600 ohm load. The same current $I_{ins}$ of equal magnitude but opposite polarity at the receiving end is given by above equation (25). Thus, the resistance of the transmission line has once again been simulated.

The analog-to-digital (A/D) signal processing circuit 36 receives the tip terminal "DC band" frequency signals applied to the tip terminal 24 and the ring terminal "DC band" frequency signals applied to the ring terminal on respective signal inputs at pins 2 and 1 of a tip/ring sampling switch IC11-1. The pins 2 and 1 of the switch IC11-1 in FIG. 4 correspond to the nodes N5 and N6, respectively, of FIG. 2. The switch IC11-1 has a control input at pin 10, which is connected to pin 24 of the channel logic block 44, for receiving a transmit channel signal TCH. The signal TCH can be at a logic "0" or a logic "1". The switch IC11-1 is shown in the position when the pin 10 is receiving the logic "0". It can be seen that the switch IC11-1 is biased to accept input signals between the range of +5 volts to −12 volts. As will be recalled, the voltage range of the tip or ring terminal sending signals is variable between −200 volts and +100 volts but is scaled down by the voltage divider (1/20). Thus, the level of the signal inputs at the pins 2 and 1 are reduced to be between −10 volts and +5 volts which is within the range of the tip/ring sampling switch IC11-1. The signal TCH is switched between the logic "0" and the logic "1" so that the tip and ring terminal sending signals are sampled alternately at a rate of 666 Hz. A composite tip/ring sampled signal appears at the output on pin 15 of the switch IC11-1 and is fed to the non-inverting input of an operational amplifier ICB-2 which functions as a buffer.

The buffer ICB-2 has its output connected to the non-inverting input of an operational amplifier IC18-2 which detects the polarity of the composite signal. All values of a negative polarity in the composite signal are inverted by an operationasl amplifier IC8-1 whose inputs are controlled by a switch IC11-3. If a negative signal appears at the output of the buffer IC8-2, the output of the amplifier IC18-1 will be at a logic "0". This causes the transmit polarity signal TP to be at the logic "0" which is sent to pin 40 of the channel logic block 44 (IC13), indicative of a signal having a negative polarity being transmitted. Further, the control input at pin 11 of the switch IC11-3 will be at the logic "0" causing the switch to assume the position as shown. As a result, the polarity detection amplifier ICB-1 is connected in the configuration of an inverting amplifier having a gain of 1. Thus the voltage Vp at its output will be positive. On the other hand, if a positive signal appear at the output of the buffer ICB-2, the output of amplifier IC18-2 will be at logic "1". This logic "1" is sent to the channel logic block and to the control input of the switch IC11-3. As a result, the switch IC11-3 is moved to the other position making connection between its pins 14 and 13. This, in turn, connects the amplifier IC18-1 in the configuration of a non-inverting amplifier with a unity gain. The voltage Vp at the output of the amplifier ICB-1 will thus again be positive.

Accordingly, the voltage Vp is always positive at the output of the polarity detection amplifier ICB-1 and the polarity of the original tip (ring) sending signals is indicated by the transmit polarity signal TP. The range of the voltage Vp will be between 0 volts and +10 volts corresponding to the absolute values of −200 volts to +100 volts for the sending signal. Thus, a range detector amplifier IC19-1 is biased between +12 volts and the ground potential. The amplifier IC19-1 is used to sense whether the sending signal is in a lower voltage range of 0 volts to +51.2 volts or a higher voltage range of 51.2 volts to 204.8 volts. Since both ranges will be encoded by 9-bits or 512 ($2^9$) steps, the voltage of 51.2 dividing the two ranges was chosen so that the lower range would be encoded at a higher resolution (3 times) than the higher range to provide greater accuracy for lower level signals.

Thus, the originating, tip (ring) terminal voltages in the lower voltage range of 0 volts ±51.2 volts are divided by 20 in the voltage divider (resistors A2/4-5 and A2/4-3) so that the voltage Vp at the non-inverting input of the amplifier IC19-1 will be between 0 and +2.56 volts. Similarly, the originating tip (ring) terminal voltages in the higher voltage range of 51.2 to 204.8 volts are divided by 20 so that the voltage Vp will be between 2.56 volts and 10.24 volts. The amplifier IC19-1 is used to detect whether the voltage Vp is in the higher or lower range by biasing its inverting input with a precise reference voltage of +2.56 volts. This +2.56 volts reference is generated via a voltage divider formed by resistors A9/8-7 and A9/5-6 and a supply voltage of +5.12 volts. This +5.12 volts supply is produced by an adjustable low voltage Zener diode IC15 connected to a resistor R33 and a potentiometer R32.

When the voltage Vp is less than 2.56 volts, the output of the amplifier IC19-1 will be at a logic "0" indicative of the lower range. The output transmit scale factor signal TSF is fed to pin 21 of the channel logic block IC13. The logic "0" state is caused to be latched until the next sample time by the channel logic IC13 and is provided at pin 23 as a scale factor latch signal SFL which is applied to the control input pin 9 of switch IC11-2. Thus, the position of the switch IC11-2 will be as shown. Hence, the voltage Vp will be unattenuated and will be sent at a voltage $V_{OUT}$ to the non-inverting input of amplifier IC19-2.

When the voltage Vp is greater than 2.56 volts, the output of the amplifier IC19-1 will be at a logic "1" indicative of the higher range. Accordingly, this logic "1" will be applied to the control input at pin 9 of the switch IC11-2 to create a connection between its pins 4 and 3. This causes the voltage $V_{OUT}$ to be attenuated by the negative voltage from the output of the amplifier IC18-1. With the resistors values shown and connected to the inverting input of amplifier IC18-1, there is a negative gain of ¼. With the input voltage of +5.12 volts applied, the negative voltage from the output of the amplifier IC18-1 will be equal to −1.28 volts.

When the voltage Vp is at 2.56 volts, the output voltage $V_{OUT}$ will be reduced to 0 volts. Accordingly, when the voltage Vp is in the higher range of 2.56 volts to 10.24 volts, the output voltage $V_{OUT}$ will be converted to be between 0 to 2.56 volts again by the signal SFL being at the logic "1". Since this higher range will be encoded in the same 512 steps as the lower range, there will be three times the voltage swing per step than in the lower range.

This voltage $V_{OUT}$ applied to the non-inverting input of the amplifier IC19-2 is always between 0 to 2.56 volts and will be converted by the channel logic block to a pulse signal having a variable width. The number of 1.544 MHz clock cycles in the channel logic is made to be equal to the pulse width which is encoded into a 9-bit signal. The maximum pulse width will be equal to the count of 512 corresponding to the voltage $V_{OUT}$ of 2.56 volts. The pulse width to be encoded is made equal to the time it takes to charge up a capacitor C18 to the voltage $V_{OUT}$. When the voltage $V_{OUT}$ is received initially on the non-inverting input of the amplifier IC19-2, the output signal TT will be at a high level. In response to this, the counter in the channel logic block1 44 will begin counting and a signal TCS will be generated to cause the transistor Q10 to be turned on, thereby charging up the capacitor C18. When the voltage on the capacitor C18 exceeds the voltage $V_{OUT}$, the output signal TT from the amplifier IC19-2 will change to a lower level to cause the turning off of the counter. Further, the channel logic will cause a reset signal TRS to go high in order to discharge the capacitor C18 prior to the next sample time. If the voltage $V_p$ is equal to 0 volts, the counter will produce a 0 count in a 9-bit binary format (i.e., 000 000 000). On the other hand, if the voltage Vp is equal to 2.56 volts, the counter will produce 512 counts in the binary format (i.e., 111 111 111).

The encoded signal from the channel logic 44 at the sending end (location #1) is transmitted by control of the pins 15, 17 and 18 over the transmission line 12 to the channel logic 44a (location #2) at the receiving end. The channel logic 44 receives the encoded transmitted signals from the channel logic 44a on input pin 3 under control of the pins 4, 5 and 7.

The digital-to-analog (D/A) signal processing circuit 38 is coupled to receive the digital signals from the channel logic 44. For ease of illustration, it will be assumed that the receiving end (location #2) is sending back the same signals to the sending end. The received 9-bit signal is encoded to represent the pulse width of a signal $\overline{RCS}$. The encoded word is a binary value between 0-512. This word can be converted to time by counting clocks during the pulse width. Thus, the time in seconds is determined by the number of clocks (0-512) divided by 1.544 MHz. This is the charging time of the capacitor C6, and this will produce a voltage level between 0 volts and 2.56 volts across the capacitor C6. The charging time of the capacitor C6 will be equal to the charging time of the capacitor C18. For the value shown, the charge time is 0.3316 msec corresponding to the voltage $V_{OUT}$ of 2.56 volts. A reset signal RRS, which is at a low level during the charging time, will be changed to a high level prior to the next sample in order to discharge the capacitor C6.

The voltage on the capacitor C6 will now be adjusted by a scale factor dependent upon whether the original transmitted voltage $V_{OUT}$ was in the higher or lower voltage range. This is accomplished by a signal RCD which is low when the voltage $V_{OUT}$ is in the lower range and is high when the voltage $V_{OUT}$ is in the higher range. When the signal RCD is low, the switch IC10-2 is open and the operational amplifier IC7-2 provides a unity gain so that its output voltage $V_{OUT}'$ will be in the range of 0 to +2.56 volts. When the signal RCD is high, the switch IC10-2 provides a connection of its pins 4 and 3 which connects the resistors A13/9-10 and A13/7-8 into the inverting input of the amplifier IC7-2. The other end of the resistors A13/9-10 and A13/7-8 are connected to −1.28 volts. This results in the amplifier providing a level adjusted gain of 3 for the resistors values shown. Thus, the voltage $V_{OUT}'$ will be transformed into the range of +2.56 volts (0 volts on the capacitor C6) to +10.24 volts (2.56 volts on the capacitor C6). Therefore, the levels of the originating tip (ring) terminal signals, i.e., $|V_{in}/20|$, are retrieved.

The original signal polarity is received from the channel logic 44 as the signal RP which is sent via the transistor Q17 to the control input pin 11 of IC9-3. The switch IC9-3 is used to invert the original signal polarity so that the voltage received by the line drivers will be opposite in direction with respect to the tip (ring) sending voltage signal. Thus, if the original signal was positive, the polarity signal RP will be high so as to turn on the transistor Q17. As a consequence, the control input pin 11 of the switch IC9-3 will also be high causing the amplifier IC7-1 to be switched to an inverting configuration with a unity gain and thus the signal $V_{OUT}''$ at the output of the amplifier IC7-1 will be inverted from the voltage $V_{OUT}'$ at the output of the amplifier IC7-2. If the original signal was negative, the polarity signal RP will be low so as to turn on the transistor Q17. This causes the control input pin 11 of the switch IC9-3 to be low. The amplifier IC7-1 will now be configured as a non-inverting amplifier as shown with a unity gain. Therefore, the signal $V_{OUT}''$ at the output of the amplifier IC7-1 will remain positive.

The output voltage $V_{OUT}''$ is used to charge up either the tip terminal capacitor C8 via the switch IC9-2 or the ring terminal capacitor C7 via the switch IC9-1 in response to control signals RA and RB from the channel logic 44. With the control signal RA being high and the control signal RB being low, the transistor Q16 is turned off causing the control input pin 9 of the switch IC9-2 to be high, and the transistor Q18 is turned on causing the control input pin 10 of the switch IC9-1 to be low. Thus, the capacitor C8 is charged by the voltage $V_{OUT}''$. With the control signal RA being low and the control signal RB being high, the switches IC9-2 and IC9-1 will cause the capacitor C7 to be charged by the voltage $V_{OUT}''$. The control signals RA and RB occur at a rate of 333 Hz and the capacitors C7 and C8 sample and hold the values of the output voltage $V_{OUT}''$.

Elliptical filters F1, F2 are connected to the respective outputs of the amplifier IC6-1 and IC6-2 for the tip and ring terminal sampled signals. The elliptical filters are used to effectively attenuate the dominant component of the 333 Hz sample. The output of the filter F1 is coupled to the D/A tip terminal amplifier IC17-2 via a low pass filter F3 which blocks out the high frequencies. Similarly, the output of the filter F2 is coupled to the D/A ring terminal amplifier IC17-1 via a low pass filter F4. The filters F1 and F3 (or F2 and F4) function to provide a maximally flat response for frequencies below 100 Hz and a maximum attenuation of the frequency of 333 Hz. The tip signal will arrive at the output (node N2) of the D/A amplifier IC17-2 and will be equal to $-V_{in}/20$ in response to the applied tip signal of $V_{in}/20$ from the transmitting end. Similarly, the ring terminal signal will arrive at the output (node N3) of the D/A amplifier IC17-1 and will be equal to $-V_{in}/20$ in response to the applied ring terminal signal of $V_{in}/20$ from the transmitting end.

The DC-to-DC converter 46 is provided only when the tip (ring) terminal signals to be transmitted from the bidirectional port 26 are expected to be in a high-voltage range. The converter 46 is thus used to bias properly the tip (ring) terminal line drivers 28 (30) so as to maintain the components in the dynamic range for operation. For tip (ring) terminal signals in the low-voltage design, a jumper wire W5 is used to supply −48 volts to the line drivers. Also, the jumper wires W1-W4 are connected in the low-voltage operation.

The DC-to-DC converter 46 includes an oscillator formed by inverters IC14-2 and IC14-1, resistors A12/4-3, A12/6-5, R38 and a capacitor C40. The oscillator output is from the output of the inverter IC14-1 which is a squarewave at a frequency of 30 KHz. The oscillator is synchronized to a frequency of 32 I KHz or 16 Hz generated from the multiplexer. This synchronization is required so as to eliminate interference with other high frequency signals which could generate audible low frequency signals. The synchronizing pulses from the multiplexer are received via a capacitor C39, resistor A11/1-2, and a diode CR20 at the input of the amplifier IC14-1.

The squarewave output of the oscillator is converted to a triangular waveform at the input of the inverter IC14-6 via resistor A11/3-4, capacitor C28 and resistor A12/9-10. As a result, a squarewave is also produced at the output of IC14-6, but is shifted to a lower level due to the bias on the resistor A12/9-10. The squarewave output of the amplifier IC14-6 is coupled via a capacitor C29 to a flip-flop driver formed by inverters IC14-3, IC14-4, and IC14-5.

The output of the flip-flop driver is the outputs of the inverters IC14-3 and IC14-4 and is connected to the gate of a field-effect transistor Q14. The transistor Q14 is turned on and off at a 32 KHz rate for charging up the capacitors C34 and C32 via the primary P and secondary S of the transformer T1 to some desired voltage.

In order to avoid excessive current from being supplied to the transformer T1 during an overload or start-up condition, the current through the channel of the transistor Q14 is monitored by a resistor R19. When the current exceeds a certain value, such as 0.6 A, the transistor Q13 is turned on so as to toggle high the input of the flip-flop driver. As a consequence, the transistor Q14 is turned off.

The voltage on the load capacitors C32 and C34 increases as energy is transferred to them every cycle. This energy transfer will be repeated until the desired output voltage of is reached. The capacitors 32 and 34 will be charged always to the same voltage. When the voltage across the capacitor C34 exceeds 25 V, the Zener diode CR22 will conduct to cause current to flow through the resistor A11/9-10. This will pull current through the transistor Q15 (which will drop about 0.7 volts) and through the transistor Q12 which, in turn, adds a negative bias via resistor A12/11-2 to the triangular waveform at the input of the amplifier IC14-6. As a result, the transistor Q14 will be turned on a shorter amount of time per cycle by the flip-flop driver so as to maintain the 27–30 volts across the capacitors 32 and 34.

An adaptive booster control circuit is provided to allow the capacitor voltages to increase above the 27–30 volts as controlled by the Zener diode CR22. As the voltage level of the tip (ring) terminal signal increases above 0 volts, the supply voltage of normally 27–30 volts increases to maintain a sufficient margin between the supply rail and the tip (ring) terminal voltage, thereby limiting power consumption. This additional voltage boost is achieved by using the voltage $V_P$ which is proportional to the tip (ring) terminal peak voltage which is fed through operational amplifier IC16, resistor R37 and diode CR19 for charging a capacitor C38. The voltage across the capacitor C38 generates a current through a resistor R41 and a transistor Q11. As this current flows through the resistor A12/8-7, the voltage across the transistor Q15 increases. Thus, the output voltage from the converter will be regulated at a higher voltage. The 100 V Zener diode CR23 will limit the magnitude of the output voltage to approximately +110 volts and −200 volts, respectively. Output filters C35, C36 and C37 are used to filter the noise from the capacitors C32, C33 and C34 generated by the switching current.

From the foregoing detailed description, it can thus be seen that the present invention provides an improved channel unit interface circuit which can be used to provide facilities for substantially all of the various alarm companies for connecting their equipment from location to location. The interface circuit of the present invention simulates a transmission line or cable in almost every respect in the frequency range of DC to 3.5 KHz with an amplitude variation between +110 to −200 VDC.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A channel unit interface circuit for interconnecting a two-wire, bidirectional signal transmitting means and a four-wire digital signal transmitting means in a communication system, said interface circuit comprising:

a two-wire port having tip and ring terminals adapted for connection to said two-wire means;

a signal receive port adapted for connection to a first signal transmission path of said four-wire means for receiving incoming tip and ring terminal DC to 60 Hz ("DC band") frequency signals and incoming tip and ring terminal 200 Hz to 3.5 KHz ("voice band") frequency signals;

a signal transmit port adapted for connection to a second signal transmission path of said four-wire means for supplying outgoing tip and ring terminal DC to 60 Hz ("DC band") frequency signals and outgoing tip and ring terminal 200 HZ to 3.5 KHz ("voice band") frequency signals from said two-wire means;

circuit means including voice codec means, A/D signal processing means, and D/A signal processing means coupled to said four-wire means for supplying said incoming tip and ring terminal "voice band" frequency signals of said four-wire means at a first node connected to said codec means and for supplying said incoming tip and ring terminal "DC band" frequency signals of said four-wire means at second and third nodes connected to said D/A signal processing means;

tip terminal current line driver means connected between said first node and said tip terminal and being responsive to said incoming tip terminal "voice band" frequency signals of said four-wire means arriving at the first node from said codec means for applying to said tip terminal corresponding outgoing tip terminal "voice band" frequency signals;

ring terminal current line driver means connected between said first node and said ring terminal and being responsive to said incoming ring terminal "voice band" frequency signals of said four-wire means arriving at the first node from said codec means for applying to said ring terminal corresponding outgoing ring terminal "voice band" frequency signals;

voice sense amplifier means having first and second inputs coupled to said tip and ring terminal current line driver means and across said tip and ring terminals and being responsive to incoming differential "voice band" frequency signals from said two-wire means for generating an output voltage;

said tip and ring terminal line driver means being responsive to said output voltage for generating an AC input impedance across said tip and ring terminals;

said codec means of circuit means being connected to an output of said voice sense amplifier at a fourth node for supplying said outgoing tip and ring terminal "voice band" frequency signals of said two-wire means for transmission over the second path of said four-wire means; said tip terminal current line driver means being responsive to said incoming tip terminal "DC band" frequency signals of said four-wire means arriving at the second node from said D/A signal processing means for applying to said tip terminal corresponding outgoing tip terminal "DC band" frequency signals;

said ring terminal current line driver means being responsive to said incoming ring terminal "DC band" frequency signals of said four-wire means arriving at the third node from said D/A signal processing means for applying to said ring terminal corresponding outgoing ring terminal "DC band" frequency signals;

first feedback impedance means coupled between the tip terminal and an input of said tip terminal current line driver means and being responsive to incoming tip terminal "DC band" frequency signals from said two-wire means for generating a simulated tip terminal impedance;

second feedback impedance means coupled between the ring terminal and an input of said ring terminal current line driver means and being responsive to incoming ring terminal "DC band" frequency signals from said two-wire means for generating a simulated ring impedance;

said A/D signal processing means of circuit means being connected to said first impedance means at a fifth node for supplying said incoming tip terminal "DC band" frequency signals of said two-wire means for transmission over the second path of said four-wire means;

said A/D signal processing means of circuit means being connected to said second impedance means at a sixth node for supplying said incoming ring terminal "DC band" frequency signals of said two-wire means for transmission over the second path of said four-wire means; and balance network means operatively connected to said voice sense amplifier means for preventing the incoming "voice band" frequency signals in the first transmission path arriving at said receive port from said four-wire means from being returned to said transmit port.

2. An interface circuit as claimed in claim 1, wherein said first feedback impedance means comprises a series connection of a resistor and a capacitor coupled between the tip terminal and a ground potential, the junction of said resistor and capacitor being connected to the fifth node.

3. An interface circuit as claimed in claim 1, wherein said second feedback impedance means comprises a series connection of a resistor and a capacitor coupled between the ring terminal and a ground potential, the junction of said resistor and capacitor being connected to the sixth node.

4. An interface circuit as claimed in claim 1, wherein said voice sense amplifier means comprises an operational amplifier having a non-inverting input and an inverting input, and wherein said AC impedance is formed by a first series connection of a resistor and a capacitor coupled between the tip terminal and the non-inverting input of said operational amplifier and by a second series connection of a resistor and a capacitor coupled between the ring terminal and the inverting input of said operational amplifier.

5. An interface circuit as claimed in claim 1, wherein said A/D signal processing means includes tip/ring terminal sampling means for sampling alternately of said incoming tip terminal "DC band" frequency signals and incoming ring terminal "DC band" frequency signals from said two-wire means.

6. An interface circuit as claimed in claim 5, wherein said A/D signal processing means further includes means for converting said incoming tip and ring terminal "DC band" frequency signals from said two-wire means to positive signals and for scaling of the positive signals to be within lower and higher voltage ranges.

7. An interface circuit as claimed in claim 6, wherein said A/D signal processing means further includes means for converting voltage levels of the positive signals to pulse widths corresponding to charge-up times of a capacitor.

8. An interface circuit as claimed in claim 1, wherein said D/A signal processing means includes tip/ring terminal sample and hold means for sampling of said incoming tip and ring terminal "DC band" frequency signals from said four-wire means and filtering means for filtering high frequency signals from said incoming tip and ring terminal "DC band" frequency signals of said four-wire means.

9. An interface circuit as claimed in claim 1, further comprising booster control means responsive to the various levels of incoming signals applied to said tip and ring terminals for increasing correspondingly supply voltages applied to said tip and ring terminal line driver means.

10. An interface circuit as claimed in claim 1, further comprising channel logic means for substituting the eighth bit in each 8-bit byte from said codec means with low frequency data to be transmitted, said eighth bit representing the low frequency data being grouped to form low frequency data frames each formed of 12 bits consisting of a synchronizing bit, a polarity bit, a scale factor bit and 9 bits representing amplitude, each of the synchronizing bits being grouped to generate a synchronization pattern formed of 8-bits and having a sequence of 10001110.

11. A channel unit interface circuit for coupling a two-wire transmission path to a four-wire digital transmission path, said interface circuit comprising:

first circuit means for receiving incoming differential "voice band" frequency signals from said two-wire path and for transmitting outgoing "voice band" frequency signals in a first direction of said four-wire digital transmission path;

second circuit means for receiving incoming tip and ring terminal "DC band" frequency signals from said two-wire path and for transmitting outgoing tip and ring terminal "DC band" frequency signals in the first direction of said four-wire path;

third circuit means for receiving incoming composite tip and ring terminal "DC band" frequency signals and "voice band" frequency signals from a second direction of said four-wire path and for supplying said composite tip and ring terminal "DC band" frequency signals and "voice band" frequency signals to said two-wire path;

said third circuit means including a tip terminal line driver amplifier, a first feedback impedance, a ring terminal line driver amplifier and a second feedback impedance;

said tip terminal amplifier having first and second inputs coupled to receive said incoming composite tip terminal "DC band" frequency signals and "voice band" frequency signals from the second direction of said four-wire path and a third input coupled to a tip terminal of said two-wire path, said first impedance coupled between the third input of said tip terminal amplifier and the tip terminal for providing a simulated tip impedance; and said ring terminal amplifier having first and second inputs coupled to receive said incoming composite ring terminal "DC band" frequency signals and "voice band" frequency signal from the second direction of said four-wire path and a third input coupled to a ring terminal of said two-wire path, said second impedance coupled between the third input of said ring terminal amplifier and the ring terminal for providing a simulated ring impedance; and said second circuit means having an A/D signal processing circuit which includes tip/ring terminal sampling means for sampling alternately of said incoming tip and ring "DC band" frequency signals from said two-wire path.

12. An interface circuit as claimed in claim 11, wherein said first feedback impedance comprises a series connection of a resistor and a capacitor coupled between the tip terminal and a ground potential.

13. An interface cicuit as claimed in claim 11, wherein said second feedback impedance comprises a series connection of a resistor and a capacitor coupled between the ring terminal and a ground potential.

14. An interface circuit as claimed in claim 11, wherein said first circuit means comprises a voice sense amplifier having its non-inverting input coupled to the output of said tip terminal amplifier and the tip terminal and having its inverting input coupled to the output of said ring terminal amplifier and the ring terminal, said voltage sense amplifier being responsive to said incoming differential "voice band" frequency signals from said two-wire path for generating an output voltage, and wherein said ring and tip terminal amplifiers are responsive to said output voltage for generating an A/C impedance across said tip and ring terminals.

15. A channel unit interface circuit for interconnecting a two-wire, bidirectional signal-transmitting means and a four-wire signal-transmitting means in a communication system, said interface circuit comprising:

a two-wire port having tip and ring terminals adapted for connection to said two-wire means;

a signal receive-in port adapted for connection to a first signal transmission path of said four-wire means for receiving incoming tip and ring terminal "DC band" frequency signals;

a signal transmit-out port adapted for connection to a second signal transmission path of said four-wire means for supplying outgoing tip and ring terminal "DC band" frequency signals thereto;

circuit means including A/D signal processing means and D/A signal processing means coupled to said four-wire means for supplying said incoming tip and ring terminal "DC band" frequency signals at first and second nodes connected to said D/A signal processing means;

tip terminal current line driver means being responsive to said incoming tip terminal "DC band" frequency signals arriving at the first node from said D/A signal processing means for applying to said tip terminal outgoing tip terminal "DC band" frequency signals;

ring terminal current line driver means being responsive to said incoming ring terminal "DC band" frequency signals arriving at the second node from said D/A signal processing means for applying to said ring terminal outgoing ring terminal "DC band" frequency signals;

first feedback impedance means coupled between the tip terminal and an input of said tip terminal current line driver means and being responsive to incoming tip terminal "DC band" frequency signals from said two-wire means for generating a simulated tip impedance;

second feedback impedance means coupled between the ring terminal and an input of said ring terminal current line driver means and being responsive to incoming ring terminal "DC band" frequency signals from said two-wire means for generating a simulated ring terminal impedance;

said circuit means having a third node connected to said A/D signal processing means and said first impedance means for supplying said incoming tip terminal "DC band" frequency signals for transmission over the second path of said four-wire means; and said circuit means having a fourth node connected to said A/D signal processing means and said second impedance means for supplying said incoming ring terminal "DC band" frequency signals for transmission over the second path of said four-wire means.

* * * * *